(12) United States Patent
Bigio et al.

(10) Patent No.: US 10,818,110 B2
(45) Date of Patent: Oct. 27, 2020

(54) METHODS AND SYSTEMS FOR PROVIDING A MIXED AUTONOMY VEHICLE TRIP SUMMARY

(71) Applicant: NIO USA, Inc., San Jose, CA (US)

(72) Inventors: Robin Bigio, San Francisco, CA (US); Zachury B. Minjack, San Francisco, CA (US); Timothy J. Meador, Fairfield, CA (US); Daniel Paul Nacamuli, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 294 days.

(21) Appl. No.: 15/947,232

(22) Filed: Apr. 6, 2018

(65) Prior Publication Data
US 2019/0311559 A1    Oct. 10, 2019

(51) Int. Cl.
G07C 5/08 (2006.01)
G01C 21/36 (2006.01)
G07C 5/00 (2006.01)

(52) U.S. Cl.
CPC ....... G07C 5/0841 (2013.01); G01C 21/3697 (2013.01); G07C 5/008 (2013.01)

(58) Field of Classification Search
CPC ...... G07C 5/0841; G07C 5/008; G07C 5/085; G01C 21/3697
See application file for complete search history.

(56) References Cited

U.S. PATENT DOCUMENTS

| | | | |
|---|---|---|---|
| 4,939,652 A | 7/1990 | Steiner | |
| 5,797,134 A | 8/1998 | McMillan et al. | |
| 2013/0304514 A1* | 11/2013 | Hyde | G06Q 40/08 705/4 |
| 2017/0124658 A1* | 5/2017 | Gordon | G06Q 40/08 |
| 2018/0118219 A1* | 5/2018 | Hiei | B60W 50/14 |
| 2018/0197440 A1* | 7/2018 | Ramachandra | G09B 19/167 |
| 2018/0339712 A1* | 11/2018 | Kislovskiy | H04W 4/021 |
| 2019/0064805 A1* | 2/2019 | Frazzoli | G05D 1/0061 |
| 2019/0250620 A1* | 8/2019 | Huang | G08G 1/0116 |

OTHER PUBLICATIONS

"Snapshot," Progressive Casualty Insurance Company, Jul. 2017, retrieved from https://www.progressive.com/auto/snapshot/, 6 pages.
"Drivewise," Allstate Insurance Company, Jul. 2017, retrieved from https://www.allstate.com/drive-wise.aspx, 9 pages.

* cited by examiner

*Primary Examiner* — Mary Cheung
(74) *Attorney, Agent, or Firm* — Sheridan Ross P.C.

(57) ABSTRACT

A vehicle can produce a user interface that provides details about the autonomous driving benefits for a journey at the end of each trip and can keep a log of autonomous driving (AD) and manual driving (MD) history. The metrics that would be monitored and displayed may include one or more, but is not limited to, a time on the road, a time in traffic, money spent on electricity for a battery, a time in manual mode, a time in autonomous mode, multiple stops, hard accelerations, hard brakes, a time spent above the speed limit, routes taken, multiple stops along the way, regenerated energy, non-regenerated energy used, etc. The journey summary may include autonomous safety benefits that are unique to an AD vehicle.

20 Claims, 18 Drawing Sheets

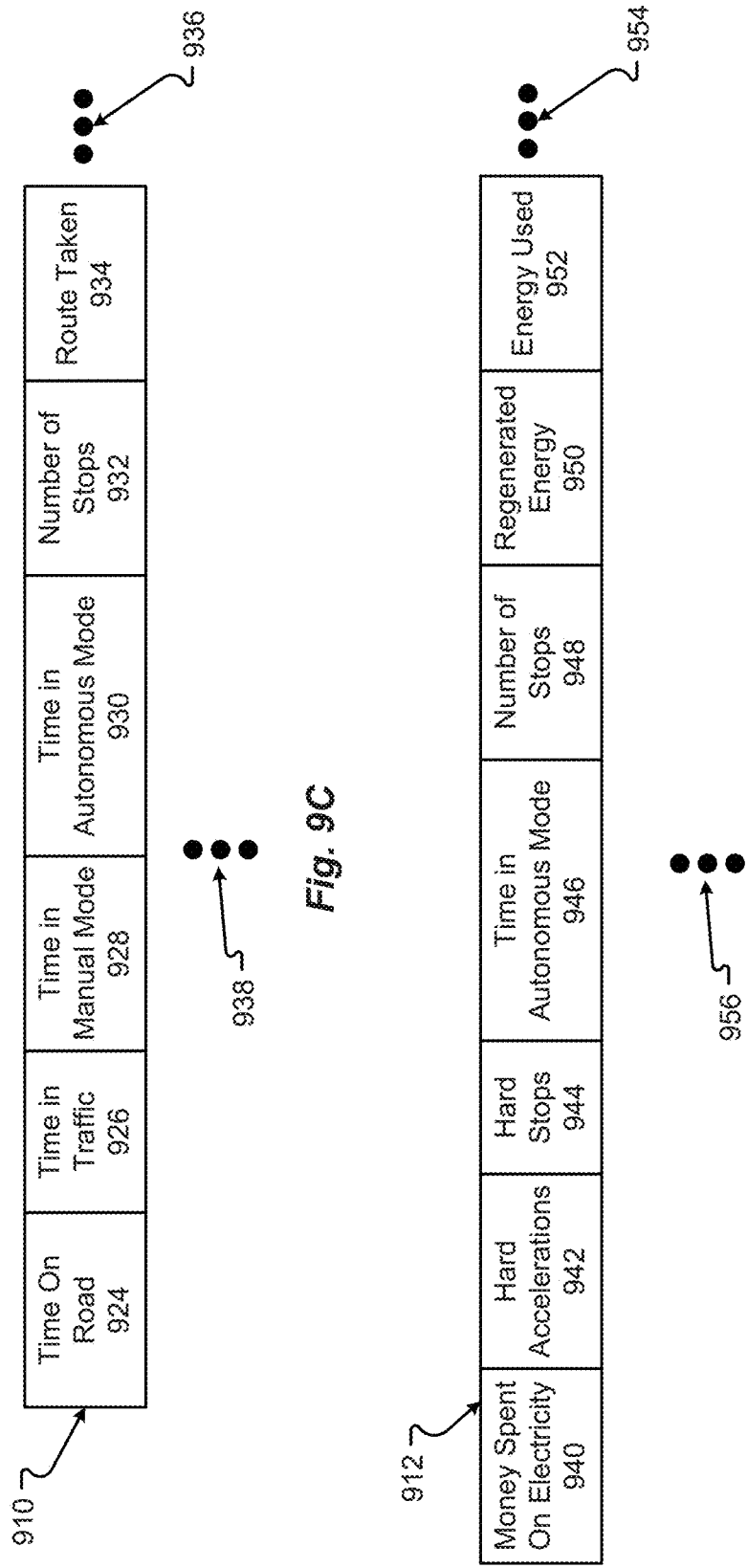

METHODS AND SYSTEMS FOR PROVIDING A MIXED AUTONOMY VEHICLE TRIP SUMMARY

FIELD

The present disclosure is generally directed to vehicle systems, in particular, toward autonomous vehicle systems.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

To provide further efficiencies while driving and bolster driver comfort, autonomous driving systems have been developed. Unfortunately, it is often difficult, if not impossible, to determine what benefit autonomous driving provides. Current driving systems do not provide for data from which a user can learn the benefits of autonomous driving.

BRIEF DESCRIPTION OF THE DRAWINGS

FIG. 9C is a diagram of another embodiment of a data store that stores trip data in accordance with embodiments of the present disclosure;

FIG. 9D is a diagram of another embodiment of a data store that stores trip data in accordance with embodiments of the present disclosure;

DETAILED DESCRIPTION

Embodiments of the present disclosure will be described in connection with a vehicle, and in some embodiments, a self-driving vehicle. Methods and systems herein can record trip information. There are many systems that exist to log certain aspects of a journey. These systems can log things like miles driven, average speed, average gas mileage, time driven, etc. These systems are often a part of a vehicle's trip computer or can be found in companion applications on a user's smartphone. Most of these systems do not have a built-in log function that can track of all this information for long periods of time. While some systems keep logs of various information, like Progressive's Snapshot program (for insurance purposes, available via a mobile application), the systems generally address driver behavior and operations.

The present disclosure includes a user interface that provides details about the autonomous driving benefits for a journey at the end of each trip and can keep a log of autonomous driving (AD) and manual driving (MD) history. The metrics that would be monitored and displayed may include one or more, but is not limited to, a time on the road, a time in traffic, money spent on electricity for a battery, a time in manual mode, a time in autonomous mode, multiple stops, hard accelerations, hard brakes, a time spent above the speed limit, routes taken, multiple stops along the way, regenerated energy, non-regenerated energy used, etc.

The journey summary may include autonomous safety benefits that are unique to an AD vehicle. For example, the vehicle may record the time, actions, and responses to actions taken while in AD mode. By way of example, a vehicle may have taken evasive action during an AD session that saved a life (e.g., a small animal, vehicle occupant, human, etc.) and/or avoided a collision. This information may be presented via the journey summary in the format of "lives saved," "accidents avoided," etc. As another example, the driving behavior of the vehicle while in AD mode may be compared against the driving behavior of the vehicle in MD mode to estimate and display an "efficiency of AD trip," etc. The efficiency may include visual indicia of information corresponding to points along a route where energy was saved based on autonomous responses versus manual historical responses. The manual historical responses may be operator specific or correspond to the average driving response of many users.

The point, time, and conditions associated with any of the actions/responses may be recorded and communicated to other devices, providing enhanced information on vehicle control in AD mode. The interface may be incorporated into the vehicle and use various vehicles sensors and systems, providing a single interface for easy access and use. In some cases, the interface may allow for analysis and display of long term trends from the collected data.

Figure 1:
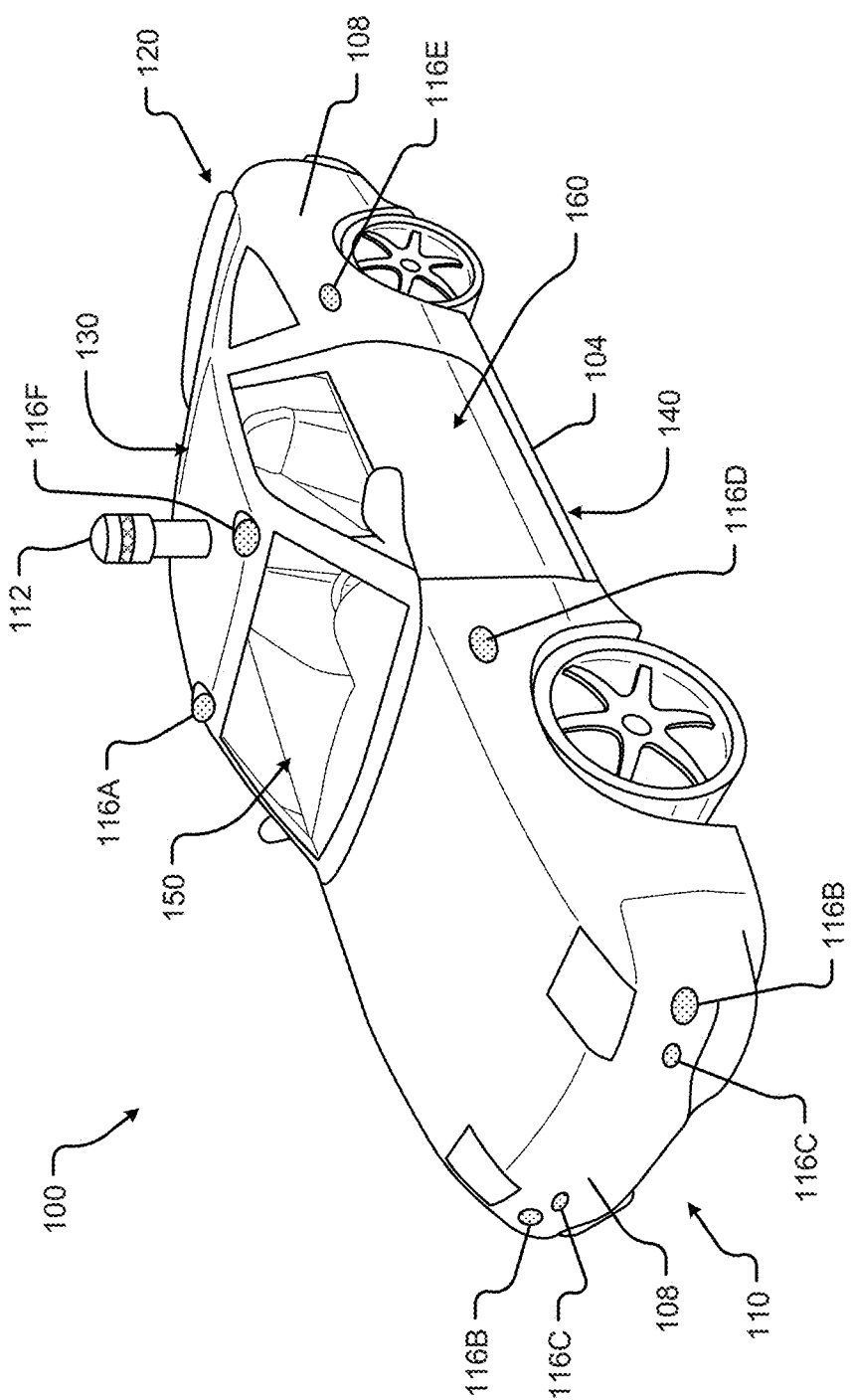
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
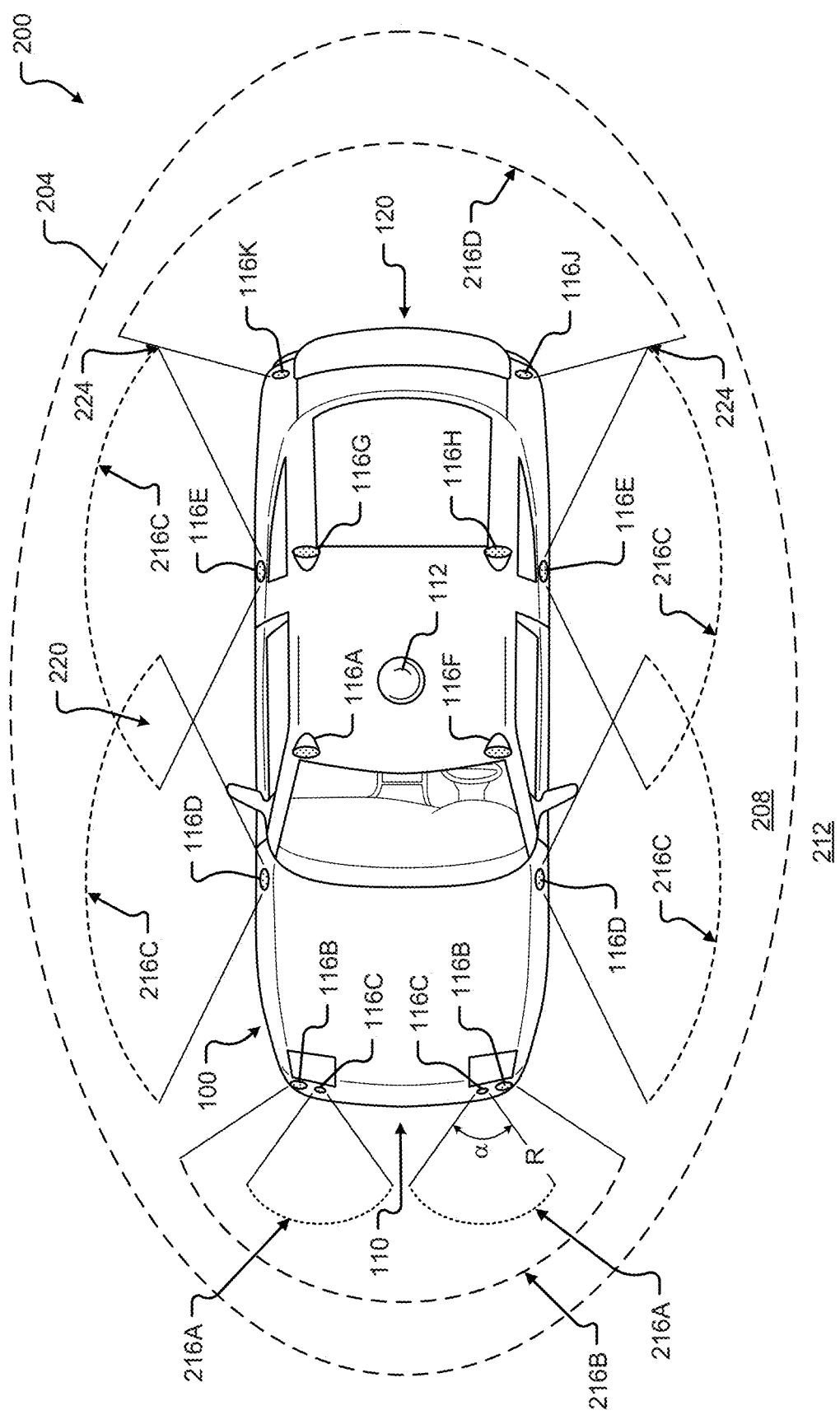
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

FIGS. 3A-3D are block diagrams of an embodiment of a driving systems environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, navigation system 302, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337 and a navigation system 302. Interior sensors 337 can measure characteristics of the inside environment of the vehicle 100 in accordance with embodiments of the present disclosure. The interior sensors 337 may be as described in conjunction with FIG. 3B. A navigation system 302 can include any hardware and/or software used to navigate the vehicle either manually or autonomously in accordance with embodiments of the present disclosure. The navigation system 302 may be as described in conjunction with FIG. 3C. in accordance with embodiments of the present disclosure.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 3A:
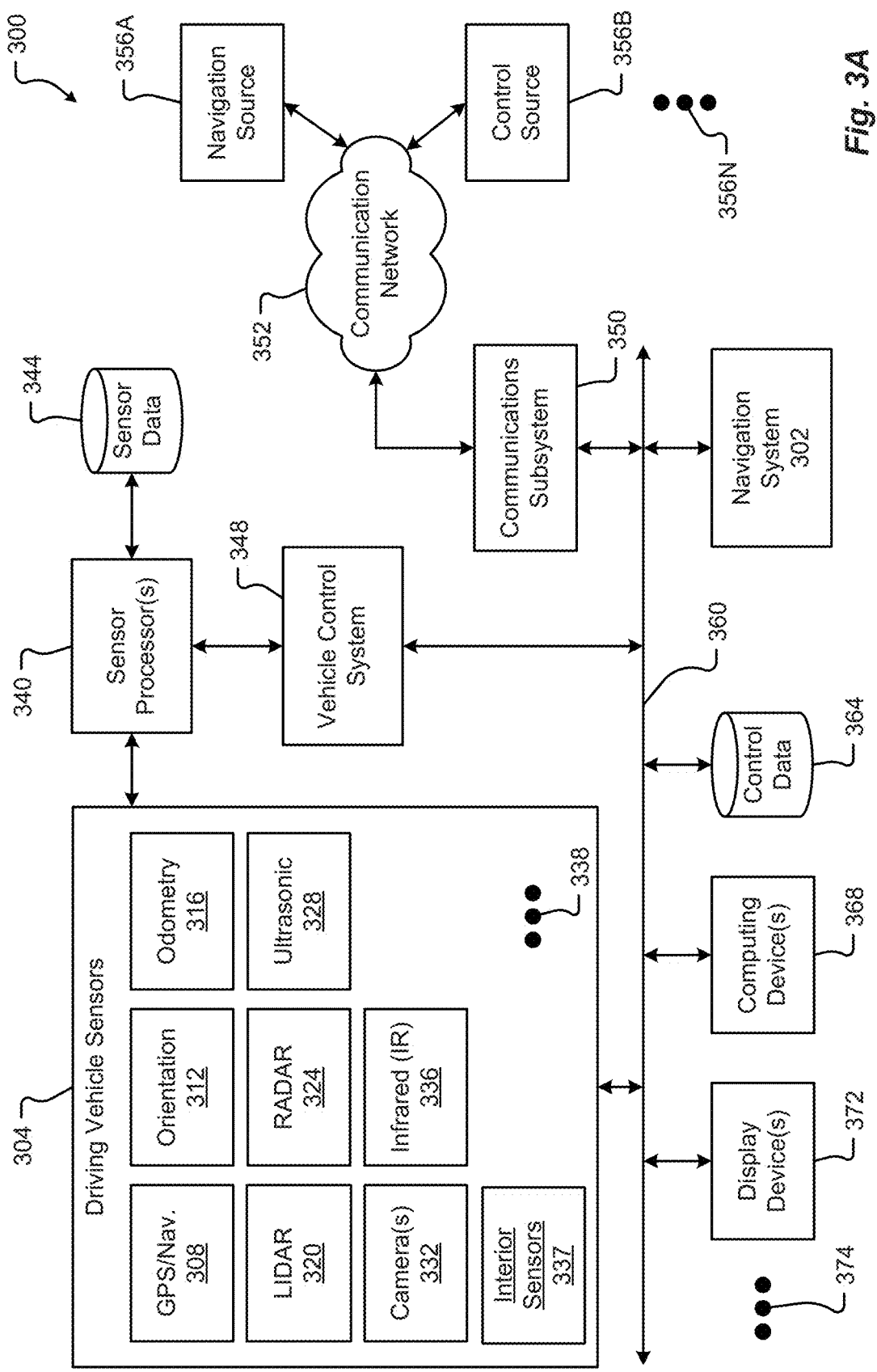
FIG. 3A is a block diagram of an embodiment of a communication environment of the vehicle in accordance with embodiments of the present disclosure.
Figure 3B:
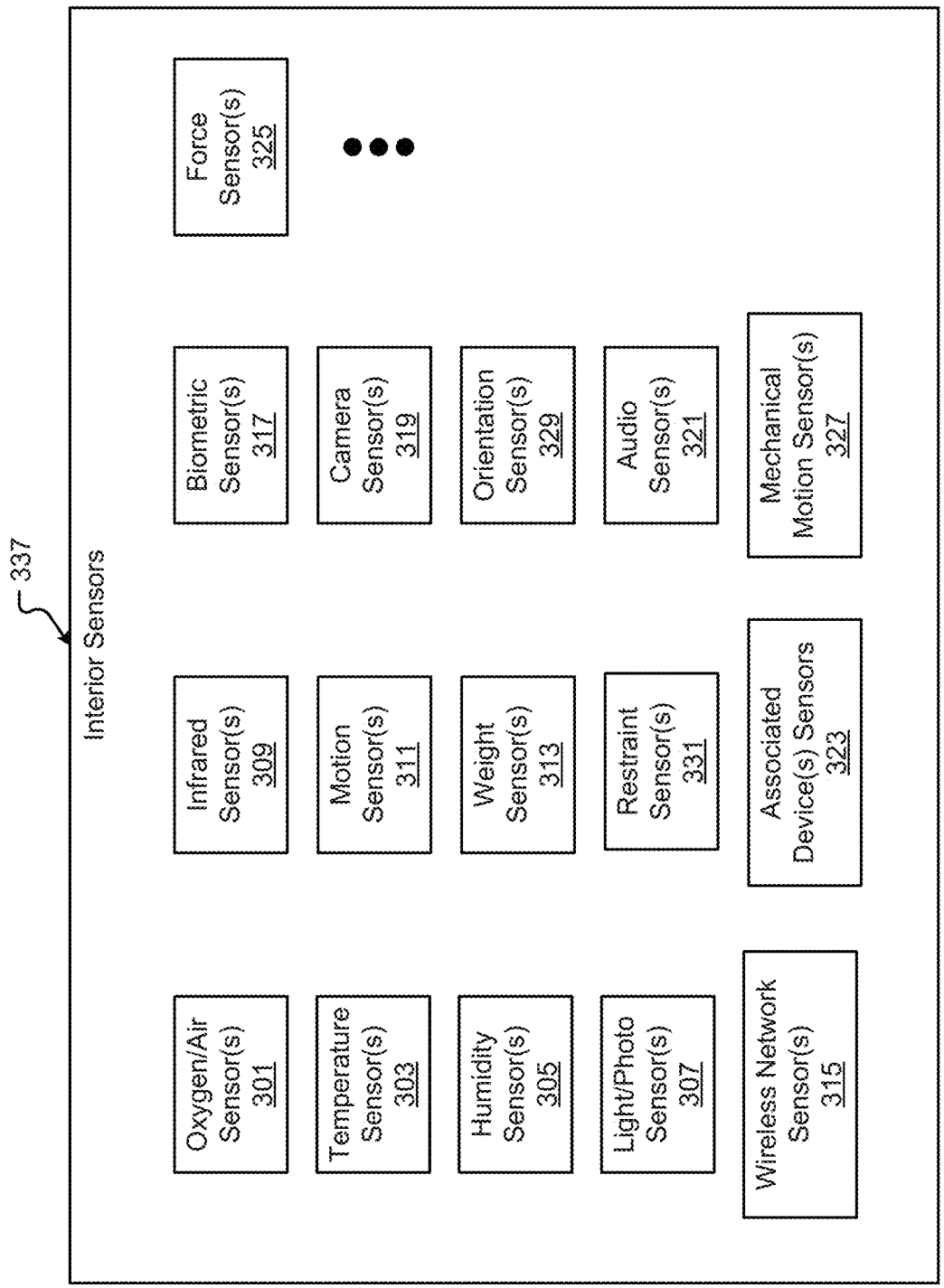
FIG. 3B is a block diagram of an embodiment of interior sensors within the vehicle in accordance with embodiments of the present disclosure.

FIG. 3B shows a block diagram of an embodiment of interior sensors 337 for a vehicle 100 in accordance with embodiments of the present disclosure. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other objects in the vehicle 100. Among other things, the Infrared sensors 309 may be used to measure temperatures, form images (especially in low light conditions), identify users, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensor 321 may be located in a first area of the vehicle 100 and a second audio sensor 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

Figure 3C:
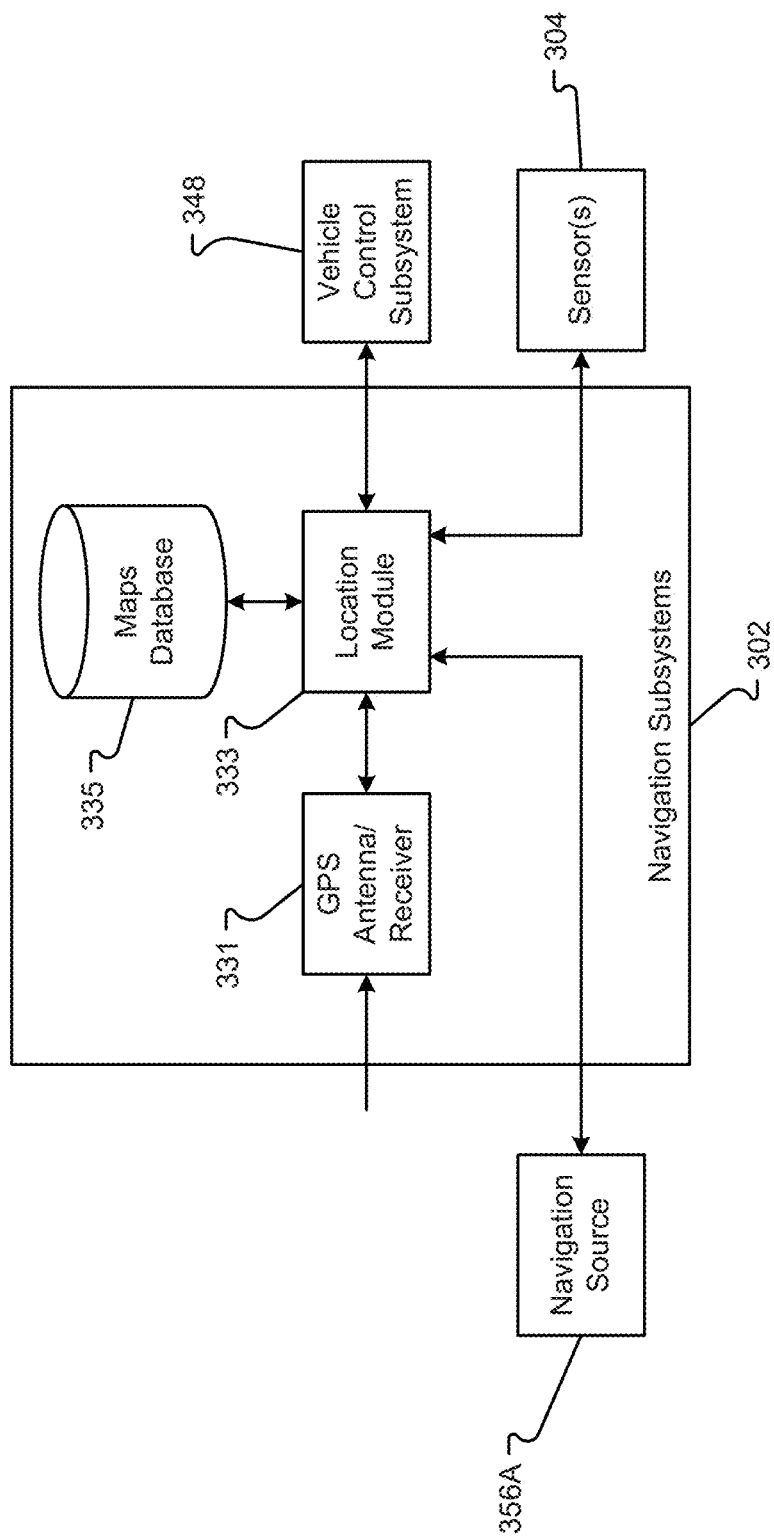
FIG. 3C is a block diagram of an embodiment of a navigation system of the vehicle in accordance with embodiments of the present disclosure.

FIG. 3C illustrates a GPS/Navigation subsystem(s) 302 in accordance with embodiments of the present disclosure. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 3D:
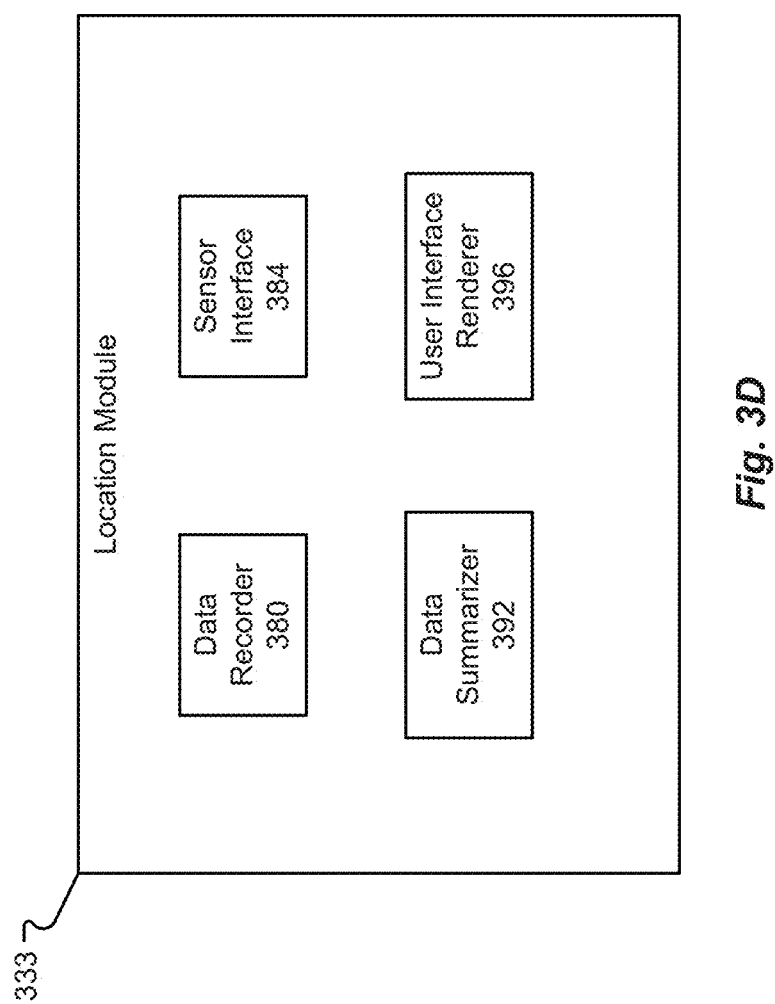
FIG. 3D is a block diagram of an embodiment of a location module of the vehicle in accordance with embodiments of the present disclosure.

FIG. 3D illustrates a location module 333 in accordance with embodiments of the present disclosure. The location module 333 can be any present or future-built component of a navigation system that may use location data, for example, from GPS, to provide navigation information or control the vehicle 100. The location module 333 can be any hardware and/or software, including a processor, ASIC, FPGA, etc., configured and operable to perform the functions and processes as described herein. The location module 333 can include several components, for example, one or more of, but not limited to: a data recorder 380, a sensor interface 384, a data summarizer 392, and/or a user interface renderer 396. Generally, the several components or modules 380-396 may be hardware, software, firmware, computer readable media, or combinations thereof.

A data recorder 380 can be any hardware and/or software capable of receiving signals from the sensor interface 384 and/or other data sources. For example, the data sources can include one or more of, but is not limited to, a vehicle control system 348, a navigation source 356A, a control source 356B, other components in the navigation system 302, a communications subsystem 350, a GPS satellite antenna/receiver 331, etc. The signals received by the data recorder 380 may be demodulated, converted, interpreted, etc. and then stored into the maps database 335, control data 364, and/or sensor data 344. Generally, the data recorder 380 can create the one or more data structures as described in conjunction with FIGS. 9A-9E. The data recorder 380 can store the data into the data structures and associated the data with a trip.

The sensor interface 384 can receive sensor data from one or more sensors 304, 337. The sensor data can include any data as described in conjunction with FIGS. 3A and/or 3B. The sensor data can also include any data associated with GPS antenna 331 or other systems that provide data to the data recorder 380. The sensor signals, received by the sensor interface 384, may be demodulated, converted, interpreted, etc. and then provided to the data recorder 380. In at least some configurations, the sensor interface 384 can convert the sensor signals into a format that can be stored by the data recorder 380. For example, any analog signal may be converted to a digital signal.

The data summarizer 392 can be any hardware and/or software capable of retrieving the sensor data stored by the data recorder 380. For example, the data summarizer 392 can retrieve data from the one or more the data structures as described in conjunction with FIGS. 9A-9E. The data summarizer 392 can retrieve the data from the data structures that is associated with a trip. This retrieve data may then be provided, by the data summarizer 392, to the user interface renderer 396 for display to the user.

Figure 4:
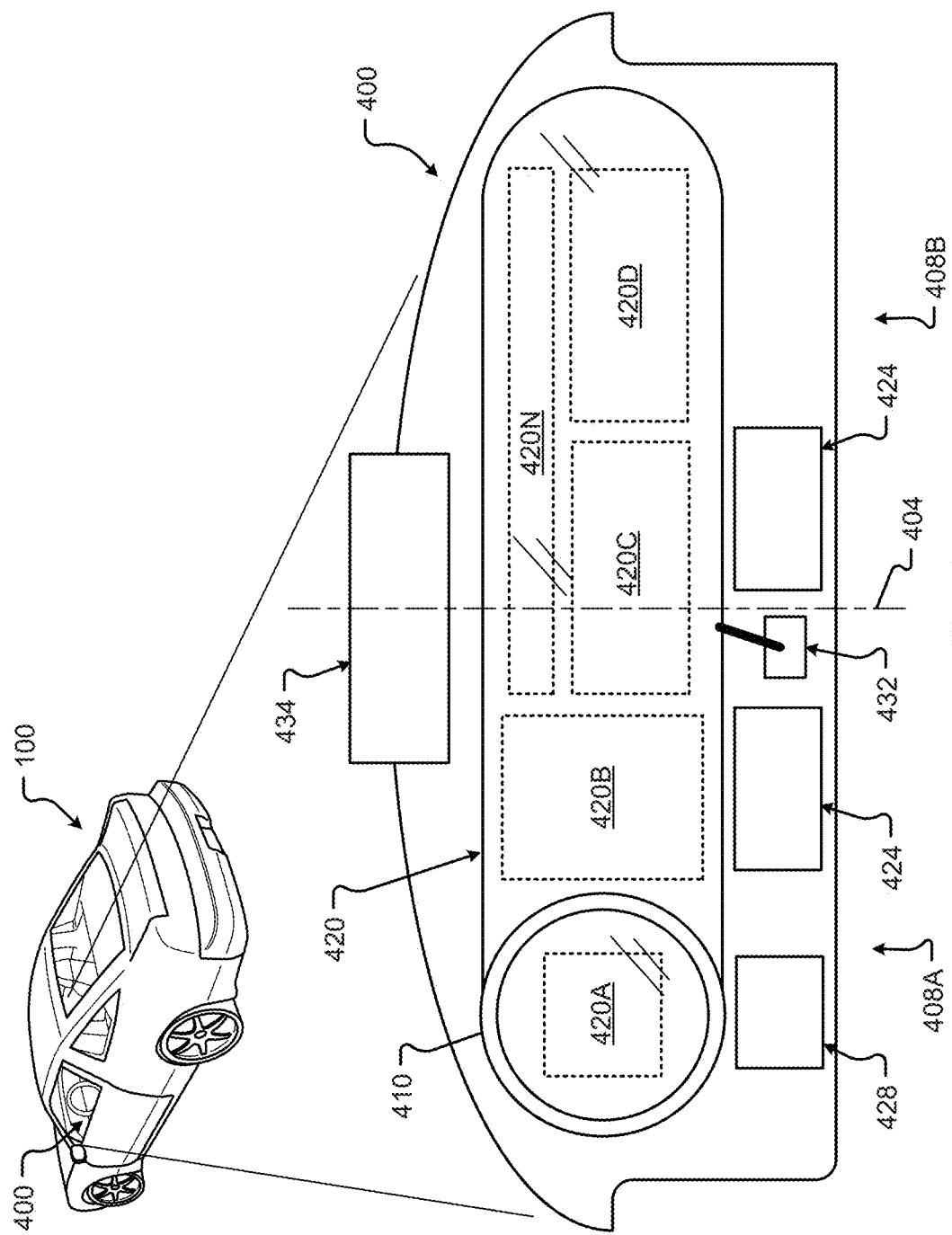
FIG. 4 shows an embodiment of the instrument panel of the vehicle according to one embodiment of the present disclosure.

The user interface renderer 396 can be any hardware and/or software capable of rendering a user interface for provision to and/or display on a vehicle display, for example, those displays as described in conjunction with FIG. 4. The user interfaces provided may include the user interfaces as described in conjunction with FIGS. 10A-10C. Thus, the user interface renderer 396 puts the information from the data summarizer 392 into a visible and understandable format for the user.

The components 380-396 are described as part of the location module 333 but may be part of another component of the vehicle 100. Further, the components 380-396 are described as being provided together but may be distributed through two or more other components of the vehicle 100.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
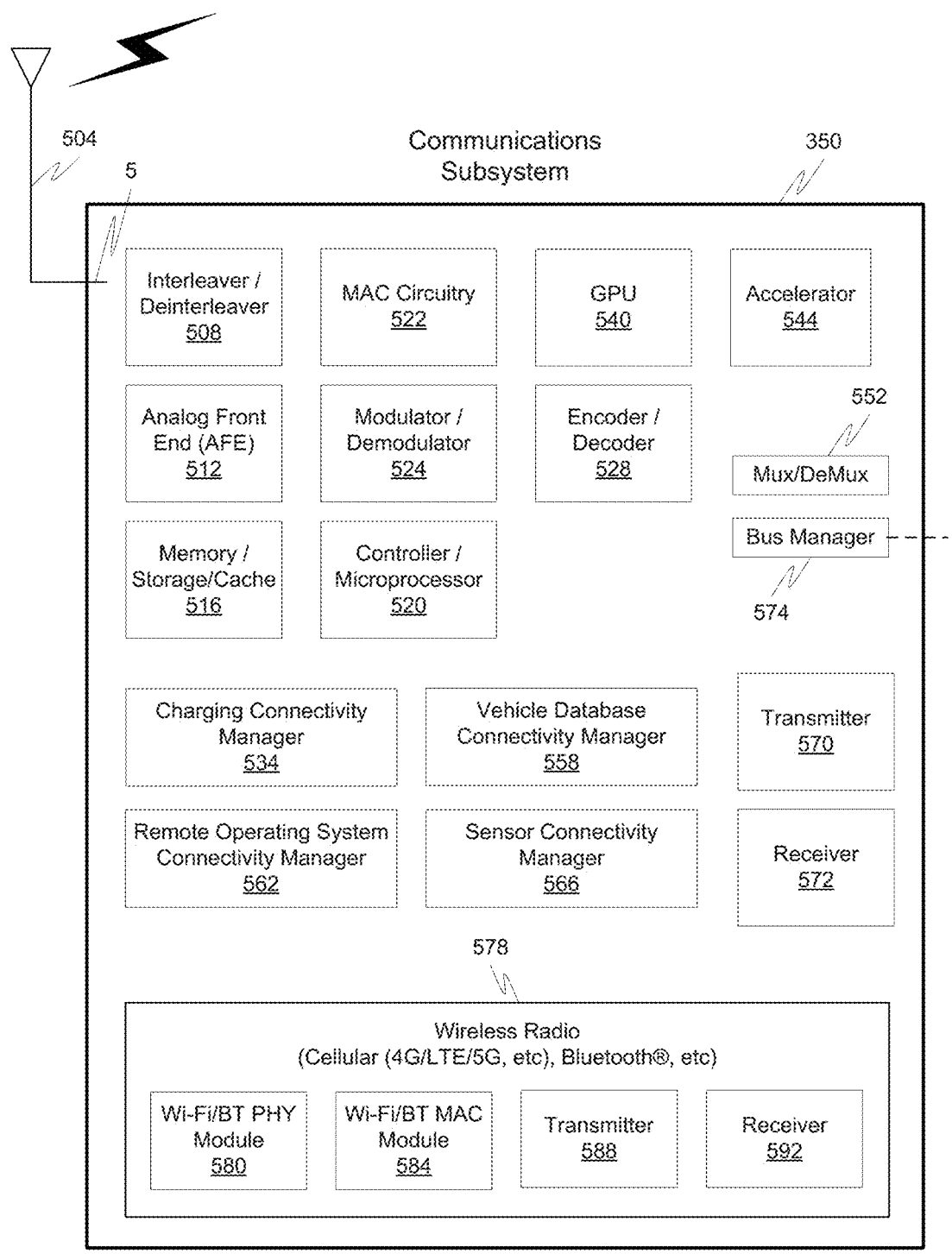
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with another vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components 578 such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long-term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a wireless radio 578, which can include one or more of, but is not limited to, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
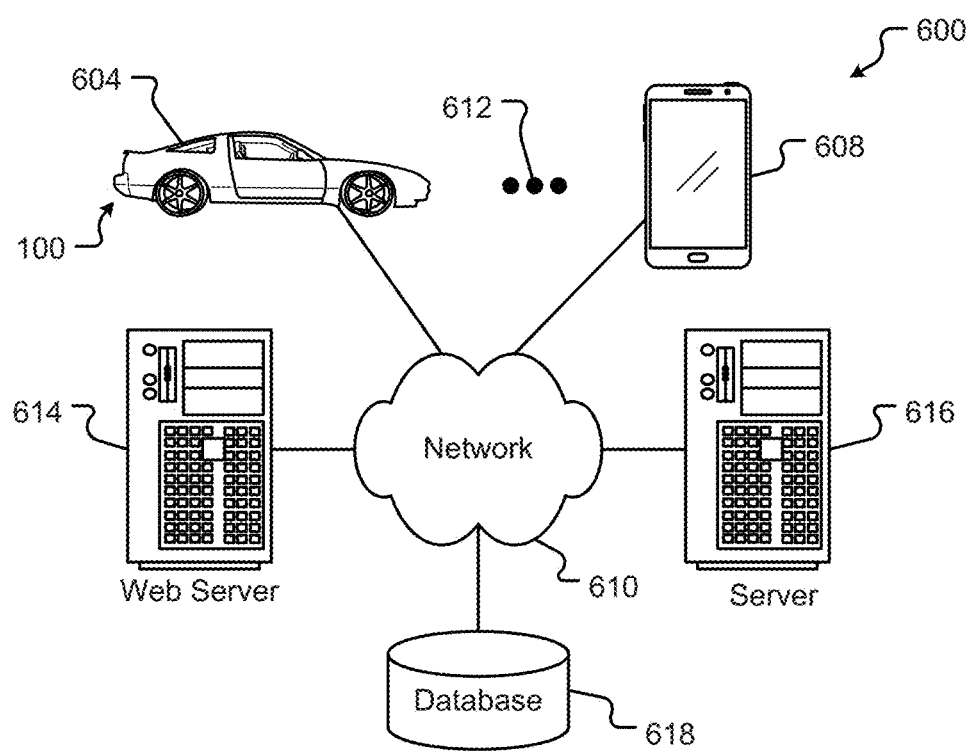
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 610 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, 614, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C #®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
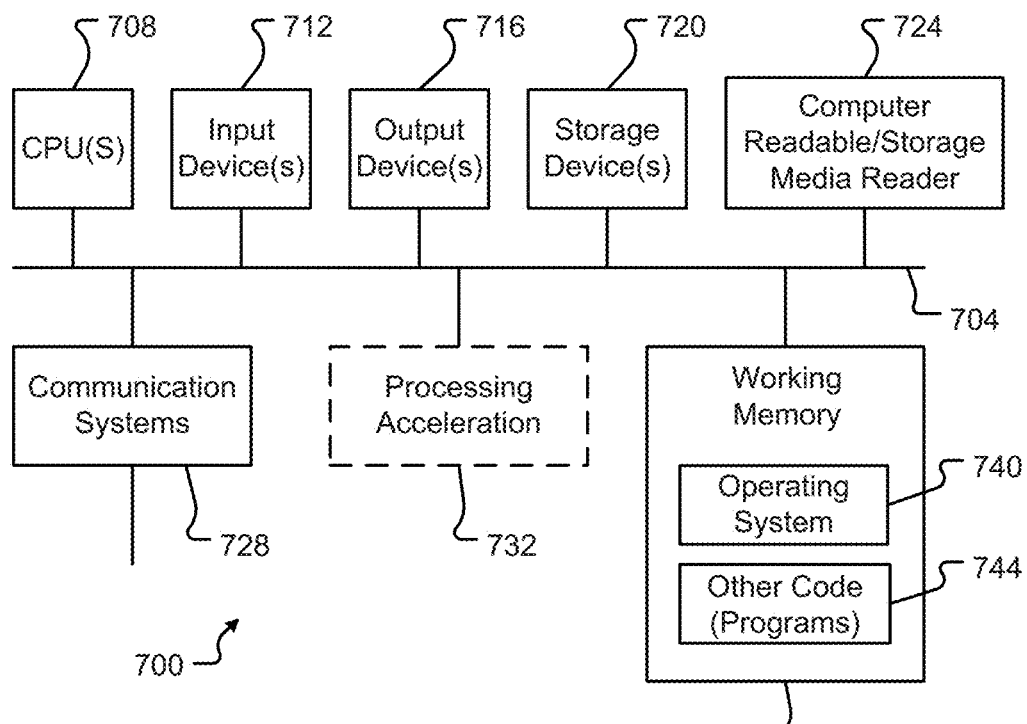
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8:
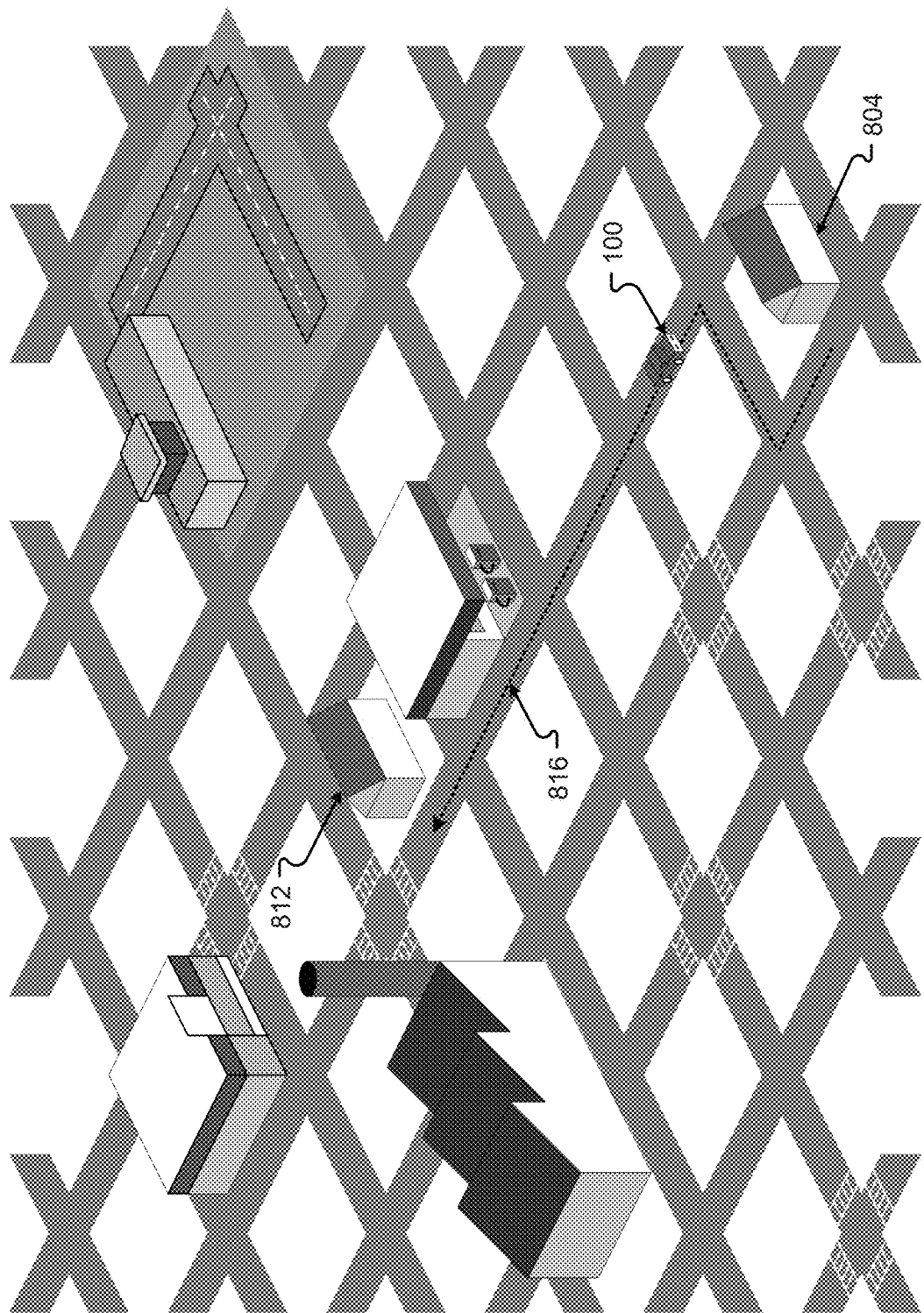
FIG. 8 shows a visual representation of an embodiment of a vehicle trip in accordance with embodiments of the present disclosure.

A visual representation 800 of a trip may be as shown in FIG. 8. The vehicle 100 may proceed along a trip route 816, from an origination point 804 to a destination point 812. Along the route 816, the vehicle 100 (e.g., the data recorder 380) may record one or more statistics or information about the route 816, the trip, the car performance, etc. This trip information may be presented to the user either in composite with other trips made before or after the trip 816 or may be provided at the end of the trip 816 to describe the functioning of the vehicle 100 during travel along route 816. Further, the trip data can be provided to a third party to be amalgamated with other trip information from other vehicles.

Embodiments of data structures that may be stored, provided, sent, retrieved, or used for trip data storage and trip data display, as described herein, may be as described in conjunction with FIGS. 9A-9E. These data structures allow the data recorder 380 of the vehicle 100 to record the various trip statistics for route 816 during the trip.

Figure 9A:
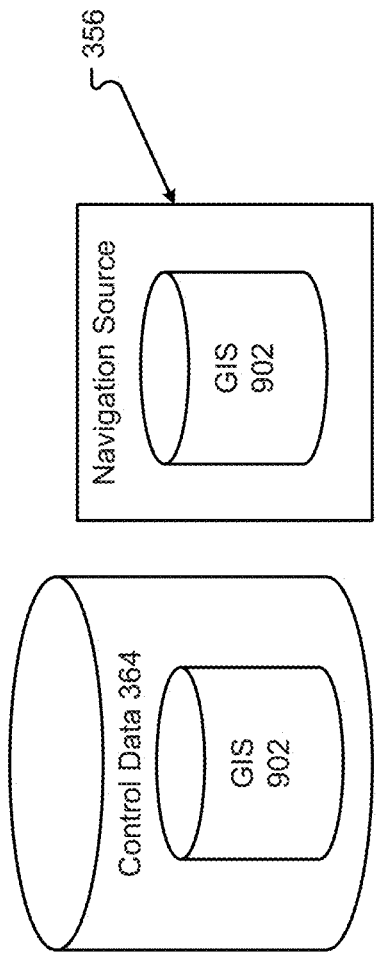
FIG. 9A is a diagram of an embodiment of a data store that stores trip data in accordance with embodiments of the present disclosure.

The data recorder 380, as described in conjunction with FIG. 3D, and as shown in FIG. 9A, or hereinbefore, may store the trip statistics in the GIS database 902 either locally in the control data 364 of the vehicle 100 or in a navigation source 356 external to the vehicle 100 but accessible by that vehicle 100 through one or more communication systems, protocols, and/or links. The GIS database 902 can include any of the information presented hereinafter in FIGS. 9B-9E.

Figure 9B:
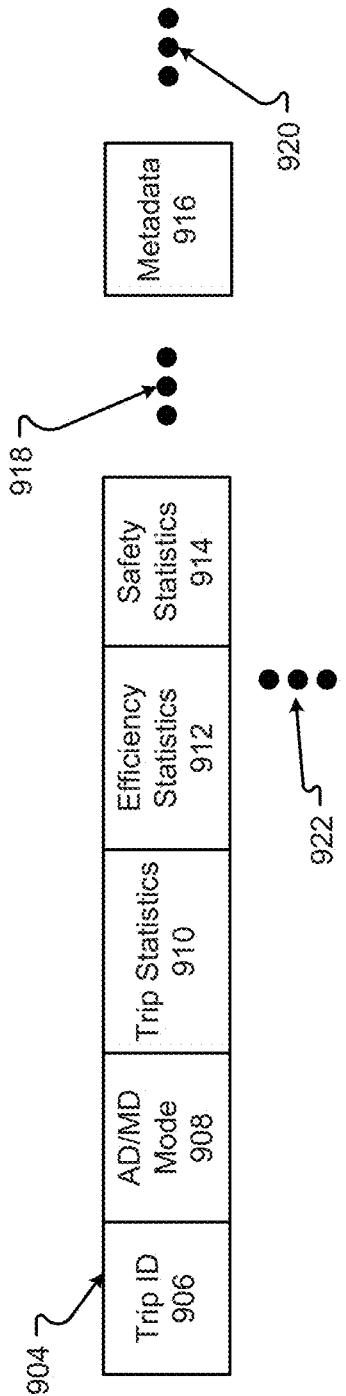
FIG. 9B is a diagram of another embodiment of a data store that stores trip data in accordance with embodiments of the present disclosure.

An embodiment of a data structure 904 for storing statistics about a trip may be as shown in FIG. 9B. The data structure 904 can include one or more of a trip identifier 906, an autonomous drive/manual drive mode indicator 908, trip statistics 910, efficiency statistics 912, safety statistics 914, and/or metadata 916. There may be more or fewer different types of statistics recorded in data structure 904, as indicated by ellipses 918. Further, there may be one or more fields than those shown in FIG. 9B, as indicated by ellipses 920. For each trip, there may be a set of statistics. Therefore, there may be more than a single data structure 904 stored in GIS database 902, as represented by ellipses 922.

The trip identifier (ID) 906 can include an identifier that can uniquely identifies the trip, for example trip 816, from other trips taken before or after the trip 816 identified by trip ID 906. The trip ID 906 can be a numeric, alphanumeric, globally unique identifier (GUID), or other type of identifier. The trip ID 906 can be any form or protocol and can include one or more bytes or bits and is not limited to any particular type of identifier.

The autonomous drive/manual drive mode indicator 908 can indicate which of the different driving modes the vehicle 100 was in during periods of time of the trip 816. For example, if for the first five minutes of the trip the vehicle 100 was in the manual drive mode, the data recorder 380 can record, in the autonomous drive/manual drive mode indicator 908 field, the start and end time of the manual drive mode and an indication of the mode as being manual drive. Any periods of time with autonomous driving can also be indicated by the start time and stop times and a mode indication. As such, the percentage of time spent in either manual drive or autonomous drive can be indicated or determined. This amount of percentage of time may also be stored in the AD/MD mode field 908. In some configurations, rather than a start and stop time, an amount of time spent in the drive mode is indicated.

The trip statistics 910 can be any type of information associated with statistics about the trip 816. Such information can indicate characteristics of the trip that do not necessarily deal with or are associated with the efficiency of the trip or the safety of the trip. Examples of information that may be provided with trip statistics 910 may be as described in conjunction with FIG. 9C.

Efficiency statistics 912 can be any information dealing with how the vehicle 100 operated during the trip. This efficiency information can be used to determine whether the way the vehicle was driving during trip 816 was efficient use of the battery, electrical usage, or fuel. The efficiency may be determine based on an amount of usage, by time saved, or other types of measures. Examples of efficiency statistics 912 may be as described in conjunction with FIG. 9D.

Safety statistics 914 can be any information about incidents or problems that happen during the trip 816 of the vehicle 100. This safety information can indicate whether the vehicle 100 had to avoid accidents or conduct maneuvers to keep the driver, passenger(s), or people and/or other vehicles outside the vehicle 100 safe during the trip 816. Examples of safety statistics may be as described in conjunction with FIG. 9E.

There may be other types of statistics available and recorded by the navigation system 302, as indicated by ellipses 918. Regardless, metadata 916 may indicate information about this data in data structure 904. Metadata 916 can include one or more of, but is not limited to, time information about when the data was recorded, the amount of data in data structure 904, or other information about the data structure 904.

Examples of trip statistics, in data structure 910, may be as shown in FIG. 9C. The data structure 910 may include one or more of the following, but is not limited to, a measure of time on the road 924, a time in traffic 926, a time in manual mode 928, a time in autonomous mode 930, a number of stops 932, a route taken 934, etc. There may be more or fewer fields in trip statistics 910, as indicated by ellipses 936. There may be more or fewer data structures 910, in each of the trip data structure 910, depending on if the trip is broken into segments and each segment has separate trip statistics. As such, there may be more data structures 910 than those shown in FIG. 9C, as represented by ellipses 938.

Time on the road information 924 can be a determination of the amount of time for the entire trip 816. Alternatively or additionally, the time on the road 924 can indicate the amount of time spent on any one leg or portion of the trip 816. For example, if the vehicle 100 is traveling along Main Street, the time on the road measure 924 can indicate the start time and stop time of the segment of the trip 816 when the vehicle was on Main Street. Further, if the vehicle then turns onto another road, for example, Elm Street, the start and stop times for the time on that road segment may also be indicated in field 924. Time on the road can have a start time and a stop time, or total time duration for the time on any road or total trip 816.

Similar to the time on the road 924 measure, the time in traffic measure 926 can indicate start or stop times when a vehicle 100 is in traffic. The determination of whether the vehicle 100 is in traffic may be indicated by speed of the vehicle compared to a known speed limit, by the presence or lack thereof of vehicles sensed around the vehicle 100, or other measures. Time in traffic 924 may also be indicated by alternative or third-party sources such as the maps database 335 or navigation source server 356A that provides traffic information. The vehicle 100 can indicate the time in traffic 924 either by a start time for traffic and a stop time for traffic or by the total time duration spent in traffic. This information may be indicated per section of the route or over the total trip 816.

The time in manual mode 928 and the time in autonomous mode 930 may be similar to or associated with the AD/MD mode 908. The time in manual mode 928 can be a start time, stop time, or a total time duration spent in manual mode across a portion or the totality of the trip 816. Similarly, the time in autonomous mode 930 can be a start time, stop time, or a total time duration spent in autonomous drive mode over a portion or the totality of the trip 816. A summation of the time in manual mode 928 and time in autonomous mode 930 should equal the total time on road 924. If both manual mode and autonomous mode were used during a trip 816, there should be some portion of the time on road in each of the time in manual mode 928 and time in autonomous mode 930 fields, and thus, provide an indication that both modes were used in the AD/MD mode 908. There may also be other information about reasons why manual mode or autonomous mode were selected or why there was a transition between the two modes that may be indicated in these fields 928, 930.

The number of stops 932 can indicate the number of times the vehicle 100 slowed beyond a certain predetermined threshold or came to a complete stop. For example, if the vehicle 100 slows down under 10 miles per hour, the vehicle 100 may recognize that rate of travel as "a stop." The number of times that these stops occurred is provided in field 932. Other information may also be provided, such as the time of when a stop or slowing occurred and the position of the vehicle 100 on the route 816 when such stop or slowing occurred.

The route taken 934 can be an indication of which route 816 was used to get between the origination point 804 and the destination point 812. The route 934 can include the latitude, longitude, GIS information, for each branch or portion of the route 816. Thus, the route taken 934 can be compared with other routes taken to reach the same or similar destination point from the same or similar origination point. The route taken 934 can include information indicative of when a change in the route is made or can have a consistent granular measure of the location of the vehicle 100 along the route taken at a predetermined interval of time or interval of distance driven by the vehicle 100, similar to bread crumbing.

An embodiment of efficiency statistics 912 may be as shown in FIG. 9D. The efficiency statistics 912 can include one or more of, but is not limited to, a money spent on electricity measure 940, a hard accelerations measure 942, a hard stops measure 944, a time in autonomous mode 946, a number of stops 948, a regenerated energy measure 950, and an energy used measure 952. There may be more or fewer fields than those shown in efficiency statistics 912 in FIG. 9D, as represented by ellipses 954. The efficiency statistics 912 may be associated with the entire trip 816 or portions of the trip 816. As such, there may be more data structures 912 than that shown in FIG. 9D, as represented by ellipses 956.

The money spent on electricity measure 940 can be an amount of money spent on a portion or a totality of the trip 816. This monetary measure 940 may be determined by a total amount of energy used multiplied by a cost per kilowatt hour or other type of cost per energy unit. The price may be provided by a user, may be retrieved from a source of recharging, or may be provided from another source. For example, if the vehicle 100 is recharged or fueled at a particular establishment, the price per kilowatt hour or price per fuel may be retrieved or provided by that third party. Thus, that information may be used to determine how much money was spent on the trip based on the energy usage multiplied by this provided price per fuel.

The hard accelerations measure 942 may be measure of accelerations that cross a predetermined threshold. The acceleration may be determined by the amount of speed gained over a certain time. For example, if the vehicle accelerates 0 to 60 in under five seconds, the location module 333 can indicate that acceleration as a hard acceleration and the data recorder 380 can store that information. The determination of what a hard acceleration is may be preset by a manufacturer, may be determined by previous driving habits of the user, for example, compared to a standard acceleration over the historical life of the user driving the vehicle 100, or may be set by a user. The hard acceleration can also be determined either by a time to gain a certain amount of speed or based off of some other pressure or distance change measure. The hard accelerations can also be provided with a start time or stop time of when the hard acceleration occurred and position measurements to determine where that hard acceleration occurred. In still other configurations, the hard acceleration can be deduced by a force sensor 325, by a change in the position of a user in the vehicle 100 (a user settling in a seat), or by another sensor 304.

Hard stops 944 are similar to hard accelerations 942 in that hard stops 944 measure when a vehicle crossed a predetermined threshold for how quickly the vehicle 100 is stopped. Similar to hard accelerations 942, hard stops 944 can be determined by the amount of speed decrease over a distance, may be determined by pressure or force changes, may be determined with other sensors, may be indicative of changes in historical user behavior, may be set by a user or by other indications. Further, hard stops 944 data can include time measurements, e.g., start times and stop times, position measurements to determine where those hard stops occurred, or other data about the hard stops 944.

Time in autonomous mode 946 may be similar to or the same as the time in autonomous mode 930 and, as such, need not be described further herein. Time in autonomous mode 946 can provide for a percentage or amount of time in autonomous mode and can be associated with other data in data structure 912, such that, the money spent or other energy information may be associated with the autonomous mode 946 to determine changes in those other measures when in autonomous mode. The number of stops 948 can be any number of stops produced by the vehicle 100 and may be the same or similar to the number of stops 932, and thus will not be explained further herein.

The regenerated energy 950 may be an amount of charge sent from one or more regenerative braking or other systems to the battery during the trip 816. This information about regenerative energy 950 can include one or more of, but is not limited to, the energy, based on volts and current received by the battery, may include start times and stop times of when energy was regenerated, and/or locations of where the vehicle 100 was located when that energy was regenerated. Further, the regenerated energy 950 information may also indicate the amount of energy that would have been regenerated had some other circumstance not occurred, such as a hard stop. The regenerated energy 950 can be compared to historical norms, for the route 816, or the entire history of the vehicle to compare the regenerated energy realized for the trip 816 to previously-set benchmarks.

The energy used 952 can be similar to the regenerated energy 950 in that energy used 952 measures the amount of energy used by the battery to travel along the route 816. Energy used 952 can be determined by the amount of energy in watts used by the battery over the course of the trip 816. Energy used can be associated with a portion of the trip 816 or the total trip 816. Energy used 952 can have start times, stop times, and location determinations included therein to determine when the energy was used and the amount used during those periods of time or during those portions of the trip 816. Generally, energy used 952 would greater than the regenerated energy 950. However, there may be a ratio or percentage comparison between energy used 952 and the regenerated energy 950. It should be noted that energy used 952 can be measured in an amount of fuel, for example, gasoline, used by the vehicle 100.

Figure 9E:
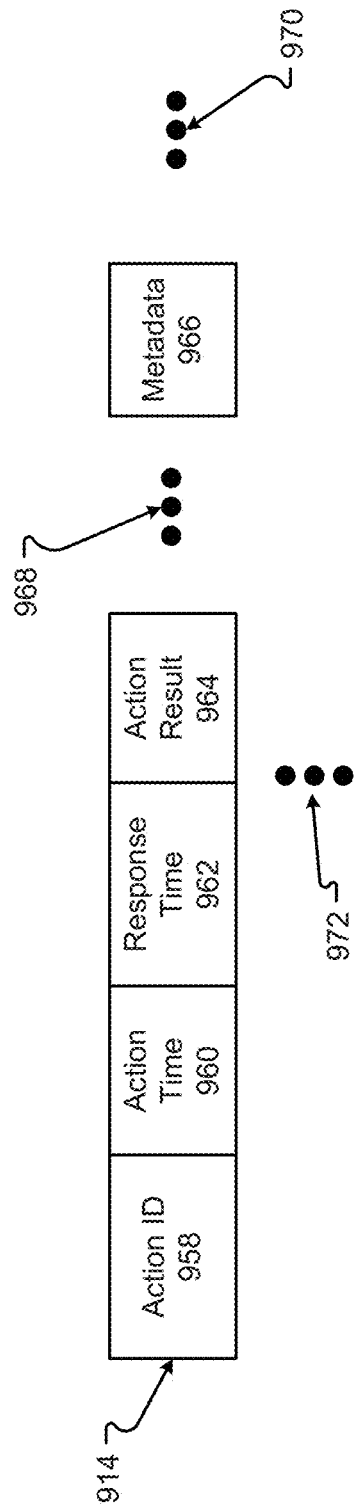
FIG. 9E is a diagram of another embodiment of a data store that stores trip data in accordance with embodiments of the present disclosure.

An embodiment of safety statistics 914 may be as shown in FIG. 9E. Safety statistics 914 can include one or more of, but is not limited to, an action identifier (ID) 958, an action time 960, a response time 962, an action result 964, and/or metadata 966. There may be other safety measures included within data structure 914, as indicated by ellipses 968. Further, there may be more or fewer fields than those shown in FIG. 9E, as represented by ellipses 970. Each different safety measure may have a data structure 914 or each portion of the trip 816 may have a different safety measure 914, as indicated by ellipses 972. Thus, the safer or less safe routes may be indicated by different safety statistics 914 and may be shared with other vehicles or used to change the route 816 used by the vehicle 100 when traveling from an origination point 804 to a destination point 812.

The action ID 958 can be any type of identifier as similarly explained with the trip identifier 906. The action ID 958 can be a numeric, an alphanumeric, a GUID, or other type of identifier. The action ID 958 can indicate and identify an action during a trip 816 and/or may be the identifier for actions during a trip 816. Regardless, the action ID 958 can identify the safety statistics 914 differently than any other statistics stored in or uniquely from other statistics stored within database 902.

An action time 960 can be a time (e.g., year, month, day, time of day, etc.) of when the safety measure occurred during the trip 816. Thus, the action time 960 can have at least a start time, if not, a start and stop time. The action time 960 can also include position measurement information to indicate where, during the trip 816, the safety measure occurred. Further, the action time 960 can also indicate the number or the total duration in seconds, minutes, or other time measure used to conduct the safety maneuvers during the entire trip 816. This action information may also be determined by adding all action times 960, for all safety measures, together.

The response time 962 can indicate the amount of time spent to conduct a safety response. Thus, response time 962 can be a total amount of time between one or more of the action time limits 960. Further, the response time 962 can indicate whether the vehicle 100 was slower or faster than some predetermined threshold standard historical measure. Response time 962 can be different between the autonomous and manual drive modes based on the user possibly being slower in responding to safety issues than the vehicle 100.

An action result 964 can indicate the result of any safety maneuver. The action result 964 can include such information as what the hazard was and how the hazard was avoided. For example, if a child entered the road and the vehicle swerved to miss the child, both the safety situation and the result can be indicated in the action result 964. Other types of results can include actually having an accident by veering into oncoming traffic but avoiding a collision by breaking an ordinance, vehicle driving law, or some other type of event, hitting a pedestrian or a bicycle, or other information. The action result 964 can also indicate how close or serious the accident avoidance was. For example, if a vehicle is missed by inches compared to feet, that measure may be indicated based on sensor measurement. Thus, there may be several different types of information in the action result 964 field to characterize both the safety issue and the response and whether that response was appropriate or effective.

Metadata 966 can be other information about the safety measure. The metadata 966 can be information summarizing or characterizing the safety information. Thus, the metadata 966 can be indications comparing the amount of time safety issues occurred, which roads had safety issues, which time of day had more safety issues, etc. This information can be used to change routes 816 or suggest autonomous or manual driving for the user.

Figure 10A:
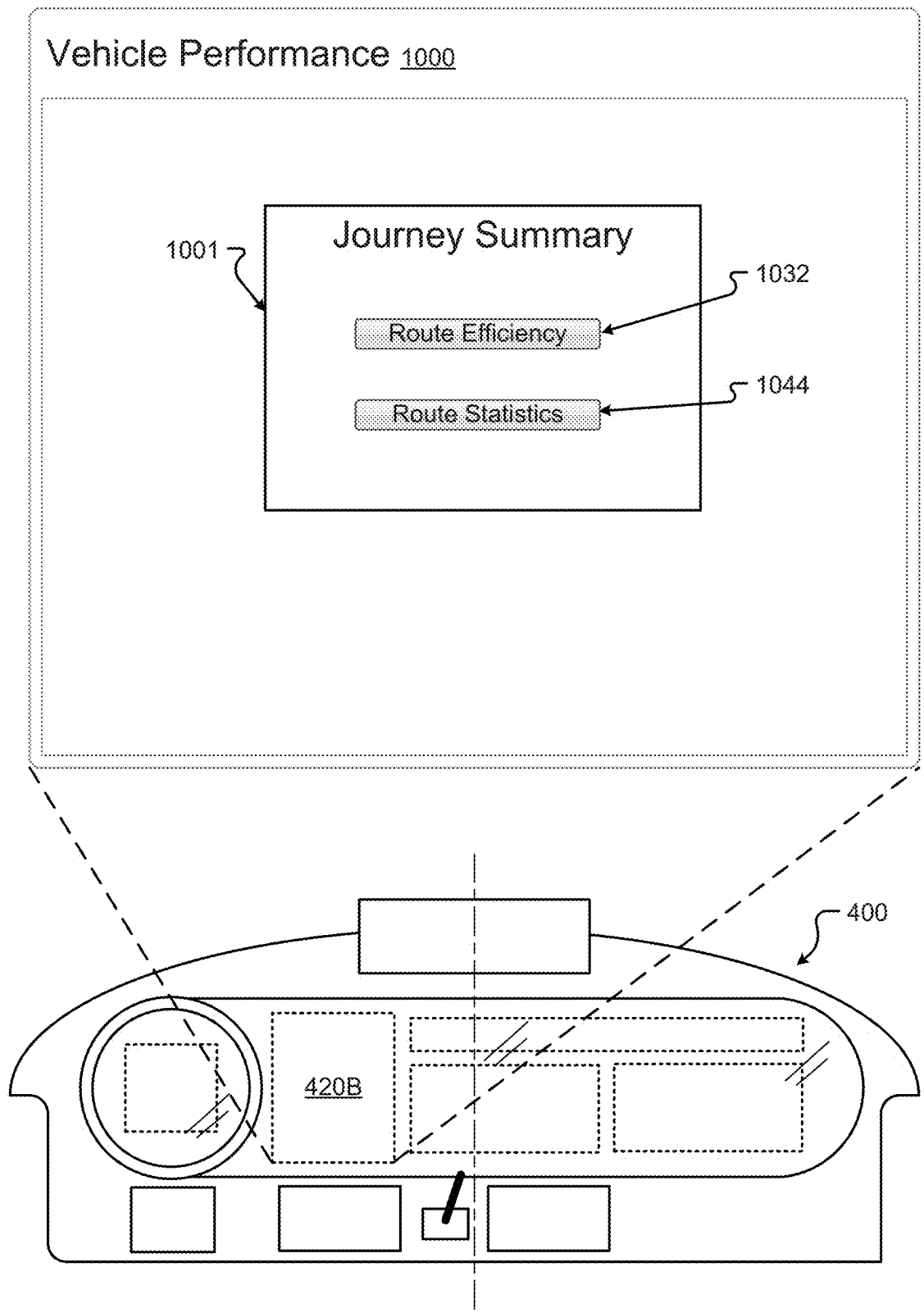
FIG. 10A is a visual representation of an embodiment of a user interface that displays trip information in accordance with embodiments of the present disclosure.

An embodiment of a user interface 1000 that may be provided, by the user interface renderer 396, in a display 420b of a head unit 400, may be as shown in FIG. 10A. The user interface 1000 may be related to vehicle performance and can provide one or more user-selectable devices (e.g., buttons, menus, etc.) to provide or receive information about a trip 816. For example, the user interface 1000 can provide a window or user interface display 1001 that allows the user to view journey summary information about a trip 816. This user display 1001 may be provided at the end of the trip or may be provided based on a selection of a user interface selectable device previously selected by the user through a touch input or other type of user interface input.

The window 1001 can include one or more user-selectable devices, such as buttons 1032 and 1044. Each button 1032, 1044, when selected, can cause the vehicle 100 to display journey summary information on the user interface 1000. For example, if the user selects button 1032 for route efficiency information, the route efficiency information may be as provided in user interface 1034 of FIG. 10C. Likewise, if the user selects the route statistics button 1044 through user input, route statistics may be as provided in user interface 1002 provided in FIG. 10B.

Figure 10B:
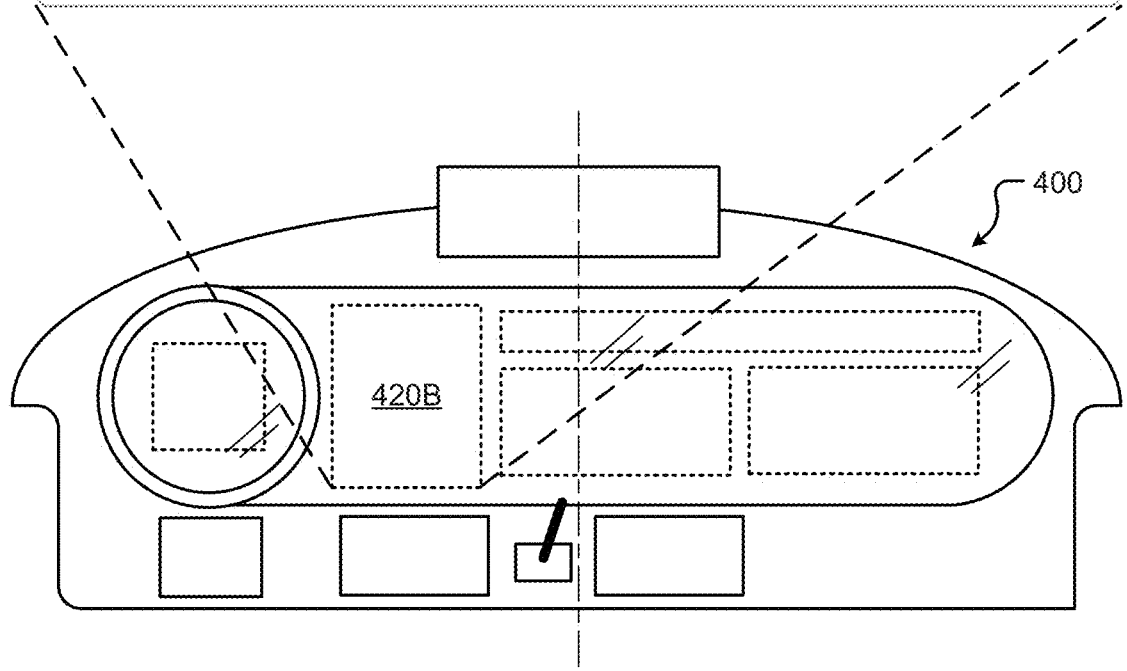
FIG. 10B is a visual representation of another embodiment of a user interface that displays trip information in accordance with embodiments of the present disclosure.

An embodiment of route statistics as provided, by the user interface renderer 396, in a journey summary user interface 1002 may be as shown in FIG. 10B. The journey summary user interface 1002 provides a table of different statistics, each of these statistics related in some way to the data provided or stored as described in conjunction with FIGS. 9A-9E. For example, an amount of time spent on the road for the trip may be shown in user display field 1004. This time may be a time in minutes, seconds, hours, etc. Similarly, other time information may be given, for example, as a time in traffic 1006 associated with data field 926, a time in autonomous drive mode 1010 associated with data 930, time in manual drive mode 1012 associated with data field 928, etc. Time on the road information 1004 can be associated with field 924. Further, other information, for example, the cost in energy or money on the trip 1008 can be associated with the money spent on electricity 940 or the amount of energy used 952. The number of hard stops 1014 can be associated with information 944, while the regenerated energy 1016 can be associated with data 950. This information shown includes only a sample of the different types of user interface information that may be displayed in journey summary user interface 1002.

Examples of the information provided may be shown further in fields 1018 to 1030. For example, the time on the road 1004 can be "23 minutes" as indicated in field 1018. The time in traffic can be 11 minutes as shown in field 1020. The cost of energy can be $0.30 as indicated in field 1022. The autonomous drive time 1010 can be 15 minutes as indicated in field 1024. The time in manual drive 1012 can be eight minutes as indicated in field 1026. The number of hard stops 1014 can be four as indicated in field 1028. The amount of regenerated energy 1016 can be 23 kilowatts as provided in field 1032. These measures or information 1018 through 1030 are exemplary and do not limit how or what information may be provided in each of those fields and associated with their different statistical categories listed in list 1004 through 1016. Further, this information may be given in different ways. For example, autonomous time 1010 can be indicated as a percentage of total time on the road. Similarly, manual drive time 1012 can be given in as a related percentage. Cost 1008 can be related to the amount of energy used, etc. This information can provide a user with a glimpse into how the journey was conducted by the vehicle 100 and provide information to improve user behavior or performance while driving the vehicle 100. Another user-selectable interface device 1032, for example, the route efficiency button, can be provided in journey summary user interface 1002 to allow the user to switch to route efficiency information, as shown in FIG. 10C.

Figure 10C:
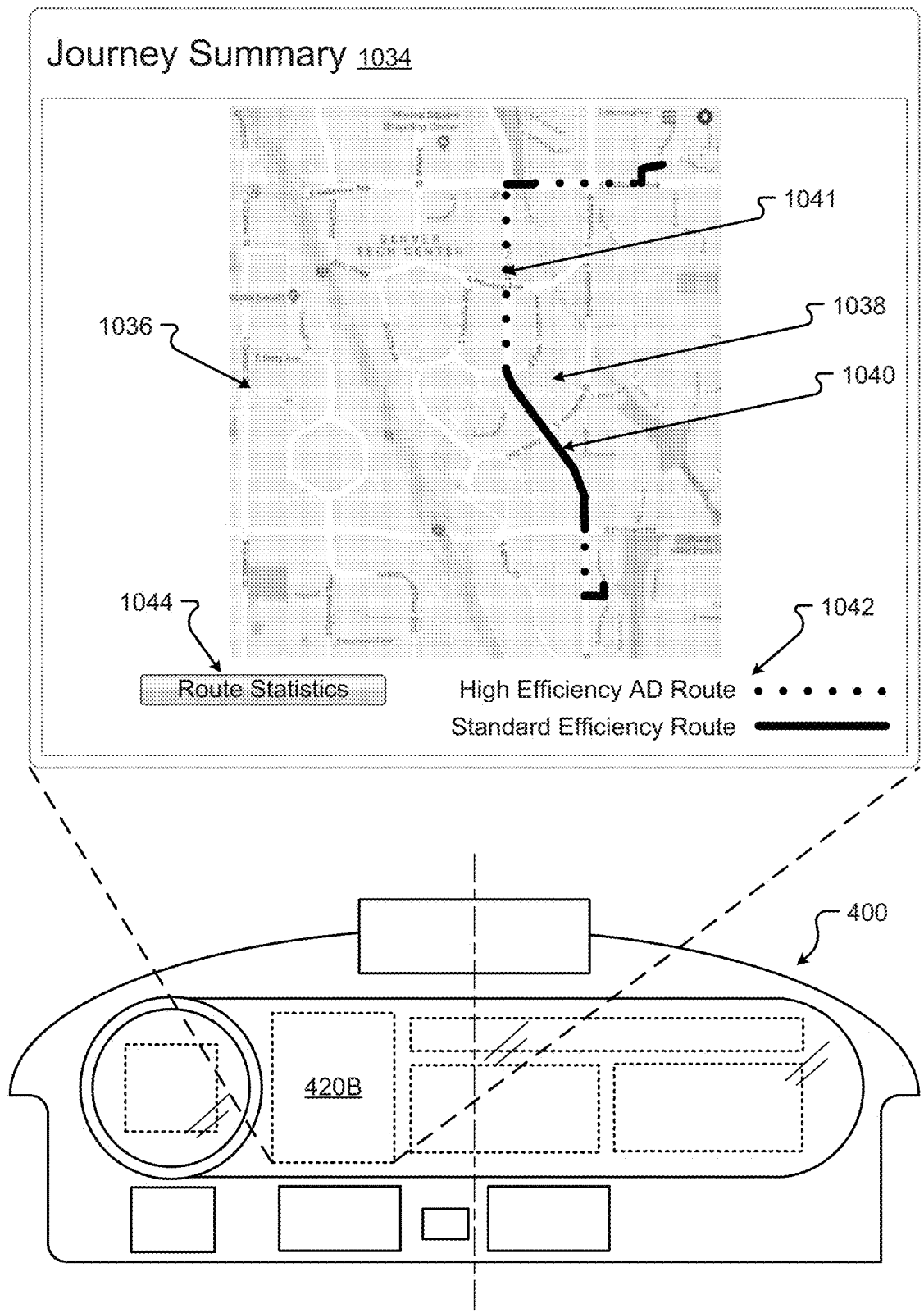
FIG. 10C is a visual representation of another embodiment of a user interface that displays trip information in accordance with embodiments of the present disclosure.

Route efficiency information may be shown in a journey summary user interface 1034, as shown in FIG. 10C. The route efficiency information may be a visual representation of a map 1036 that shows the route taken. The route may be separated into different sections or portions 1040 and 1041. The total route 1038 can have a first portion 1040 that is a standard efficiency route, meaning that during that period of time, the vehicle was performing at historical norms or below. The dotted section of route 1038, indicated by numeral 1041, can indicate a high-efficiency automated driving route. The high-efficiency route 1041 can be indicative of where the vehicle 100 was more efficient by being in autonomous mode or where the user was more efficient during that portion of the trip 1038. Whether the portion of the route is high-efficiency or standard-efficiency may be indicated by a change in the visual indicia of the route as displayed in user interface 1034.

A legend 1042 may be provided so that the user can be knowledgeable of which of the two types of indicia indicate a high-efficiency or standard-efficiency route. Further, a user-selectable interface device 1044 can be provided that allows the user to transition to the display shown in FIG. 10B. As such, the user is provided with trip statistics for one or more past trips, allowing the user to understand how, when, and whether driving in autonomous mode is more efficient than driving in manual mode to make those decisions in the future.

Figure 11:
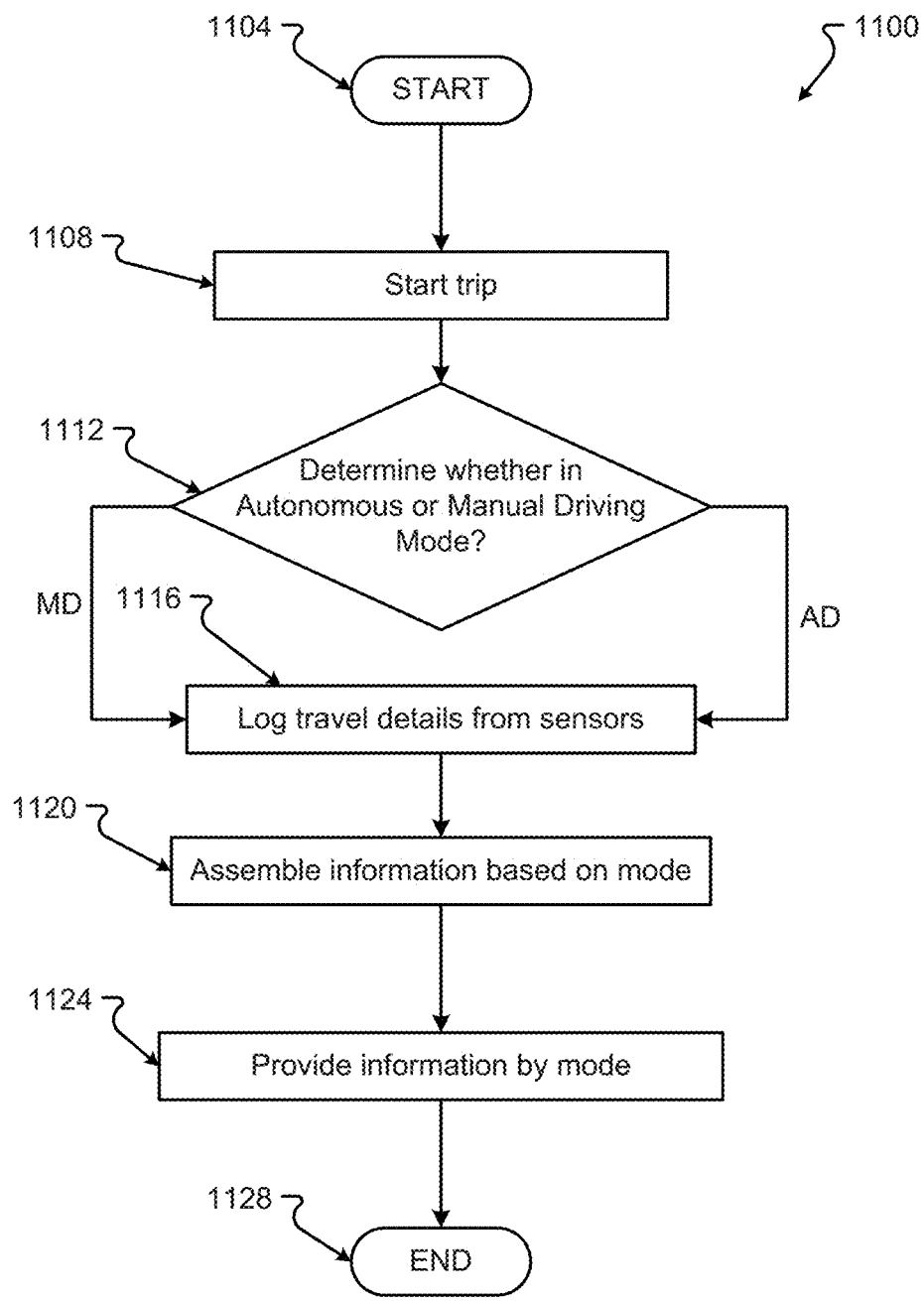
FIG. 11 is a process diagram of an embodiment of a method for storing trip data in accordance with embodiments of the present disclosure.

An embodiment of a method 1100 for storing and retrieving information about a trip 816 may be as shown in FIG. 11. A general order for the steps of the method 1100 is shown in FIG. 11. Generally, the method 1100 starts with a start operation 1104 and ends with operation 1128. The method 1100 can include more or fewer steps or can arrange the order of the steps differently than those shown in FIG. 11. The method 1100 can be executed as a set of computer-executable instructions executed by a computer system or processor and encoded or stored on a computer readable medium. In other configurations, the method 1100 may be executed by a series of components, circuits, gates, etc. created in a hardware device, such as a System of Chip (SOC), Application Specific Integrated Circuit (ASIC), and/r a Field Programmable Gate Array (FPGA). Hereinafter, the method 1100 shall be explained with reference to the systems, components, circuits, modules, software, data structures, signaling processes, models, environments, vehicles, etc. described in conjunction with FIGS. 1-10 and 12.

The vehicle 100 can start a trip 816, in step 1108. The trip may be started when the vehicle 100 is turned on or when the vehicle starts to move from the origination point 804 along route 816. Regardless of the trigger or the benchmark for starting a trip, the sensor interface 384 of the vehicle navigation system 302 can then begin to receive sensor data and provide that data to the data recorder 380 to record statistics, as described in conjunction with FIGS. 3D and 9A-9E, at the start of the trip 816.

In step 1112, the data recorder 308 can determine whether the vehicle 100 is in autonomous drive mode or manual drive mode. The data recorder 308 may receive information from the vehicle control subsystem 348 as to which mode the vehicle 100 is operating. The mode may be determined by user input or through automatic functions of the vehicle control subsystem 348. This mode information is then sent to the data recorder 308 where the data recorder 308 can store that information in the field 908 along with the information about start times for either the manual or autonomous mode in fields 928, 930, and 946. If a vehicle 100 is in autonomous drive mode, method 1100 proceeds to step 1116 along the autonomous drive branch. If the vehicle 100 is in manual drive mode, the method 1100 proceeds along the manual drive mode branch to step 1116.

The data recorder 308 then can store or log travel details from the sensors 304 and other information in data structures 904, 910, 912, and 914, in step 1116. The information stored can be any information about trip statistics 910, efficiency information 912, safety information 914, and/or information regarding metadata 916. The data recorder 308 can first create data structure 904, with the trip ID 906, storing the mode in field 908. Then, as sensors 304 provide information about details of the trip 816, the data recorder 308 may store that information in one or more of the data structures 910-916, described in conjunction with 9A-9E.

In step 1120, the data recorder 308 assembles the information, based on mode 908, with start and stop times indicating when the vehicle 100 is in manual mode or autonomous mode. Oher information, associated with the mode, may then be stored in fields 928, 930, and/or 946. The information may then be categorized in two separate data structures or portions to compare manual drive mode to autonomous drive mode.

The data summarizer 392, thereinafter, either after the trip 816 is completed or even during the trip 816, may provide the information stored in data structure 904, arranged by mode, in step 1124. The user interface renderer 396 can receive a user interface selection to provide data from data structure 904 into a display 420 of a vehicle 100. The selection may be provided to the data summarizer 392, which may then retrieve data associated with the trip 816. The retrieved data may then be given to the user interface renderer 396 to generate the one or more user interface displays, as described in conjunction with FIGS. 10A-10C. An exemplary process for providing such information may be as shown in FIG. 12.

Figure 12:
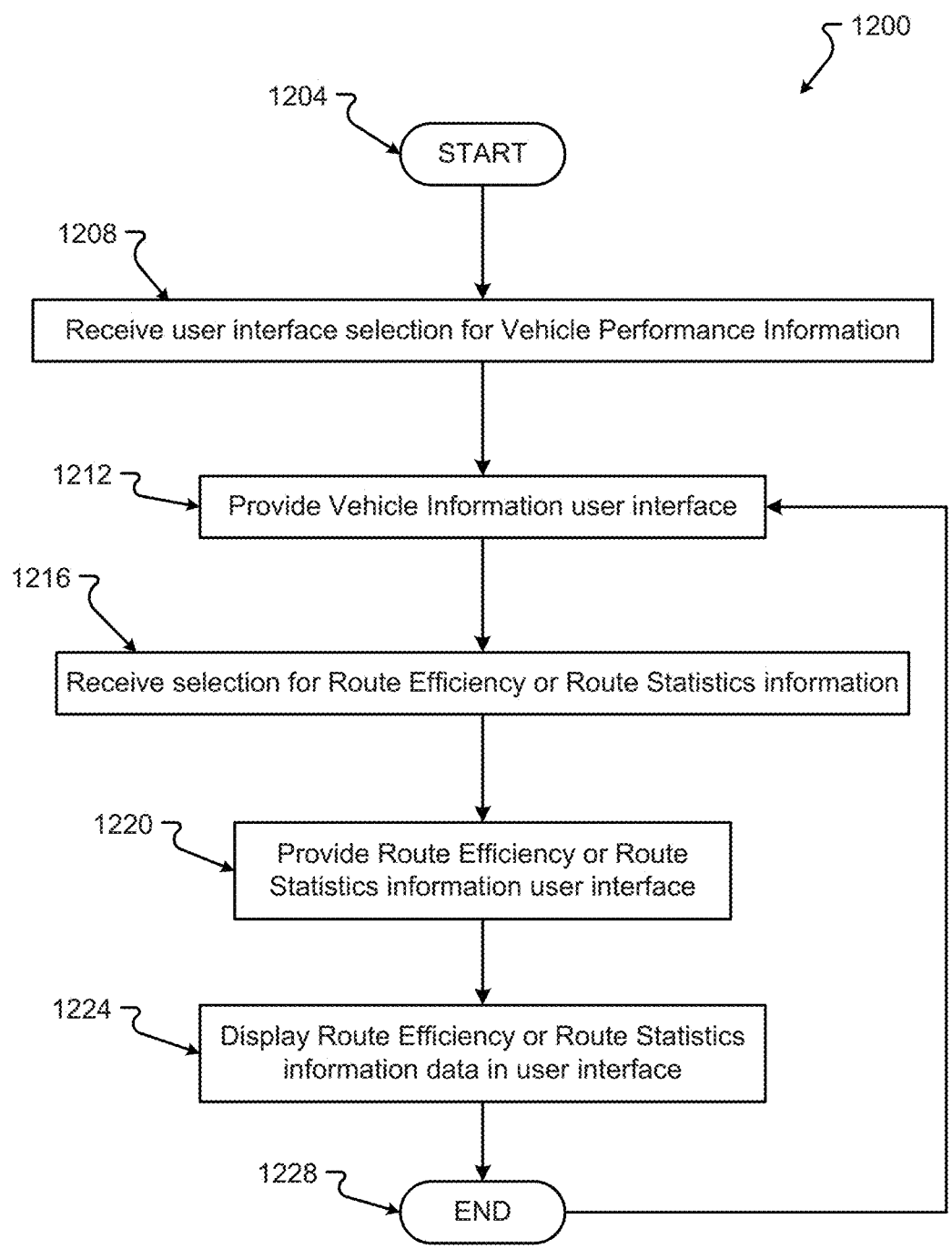
FIG. 12 is a process diagram of an embodiment of a method for providing trip data in accordance with embodiments of the present disclosure.

An embodiment of a method 1200 for providing route information to a user may be as shown in FIG. 12. A general order for the steps of the method 1200 is shown in FIG. 12. Generally, the method 1200 starts with a start operation 1204 and ends with operation 1228. The method 1200 can include more or fewer steps or can arrange the order of the steps differently than those shown in FIG. 12. The method 1200 can be executed as a set of computer-executable instructions executed by a computer system or processor and encoded or stored on a computer readable medium. In other configurations, the method 1200 may be executed by a series of components, circuits, gates, etc. created in a hardware device, such as a System of Chip (SOC), Application Specific Integrated Circuit (ASIC), and/r a Field Programmable Gate Array (FPGA). Hereinafter, the method 1200 shall be explained with reference to the systems, components, circuits, modules, software, data structures, signaling processes, models, environments, vehicles, etc. described in conjunction with FIGS. 1-11.

A user interface device 420 within a head unit 400 or other portion of the vehicle 100 that includes a user interface input and/or display may receive a user interface selection to provide vehicle performance information, in step 1208. The input may be into a joystick button, touch-sensitive display, or other type of input. The input may be on or into a user-selectable interface device, for example a display button or other type of user interface element that provides input to the vehicle 100. The selection signal may be provided through the user interface renderer 396 to the data summarizer 392 to provide information about vehicle performance. The user interface renderer 396 then may change the user interface display 420 to provide information about the vehicle performance.

The vehicle performance user interface 1000 may be displayed in the user interface 420, in step 1212. Here, the location module 333 can provide vehicle information through the vehicle performance user interface 1000. In an example, or in a first configuration, the vehicle performance interface 1000 may provide a window or display 1001 providing selections 1032, 1044 about route efficiency and/or route statistics, respectively, in a journey summary window 1001. These buttons 1032 and 1044 may be selectable to provide information about the vehicle performance.

The user interface 420 or one or more user input devices may receive a selection into either the route efficiency button 1032, the route statistics button 1044, or some other type of input to provide information, in step 1216. The user may hover a user interface element, controlled by mouse, over one of the buttons 1032, 1044. In other configurations, the user may use their finger or other type of selection device to select the buttons 1032, 1044 in a touch-sensitive display. Regardless, selection of the buttons 1032, 1044 triggers the user interface renderer 396 to change the user interface to provide information.

In step 1220, the user interface renderer 396 can receive the selection of one of the buttons 1032, 1044 and pass that selection signal to the data summarizer 392. The data summarizer 392 may then retrieve information from data structure 904. The data summarizer 392 can provide the retrieved data to the user interface renderer 396. Then, the user interface renderer 396 can then provide the retrieved information in either a route efficiency or route statistics information user interface 1002, 1034, as described in conjunction with FIG. 10B or 10C. The information may be rendered or populated, by the user interface renderer 396, within the displays 1002, 1034 based on the assigned fields. Thus, the data summarizer 392 may then read what required information is needed, and the user interface renderer 396 can place that information within the table shown in journey summary user interface 1002 or render the route through route information that is shown in journey summary user interface 1034. The information may then be displayed, in step 1224. The display of information may be provided to the user in the user interfaces 1002, 1034, as explained in conjunction with FIGS. 10B and 10C.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a feature vector node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a feature vector sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the feature vector function, and the feature vector software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to feature vector standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a vehicle, comprising: a sensor, the sensor sensing data associated with a trip conducted by the vehicle; an autonomous vehicle control system, comprising: a processor in communication with the sensor, the processor to: determine whether the vehicle is in an autonomous mode or a manual mode; receive information from the sensor regarding a characteristic of the trip; store the characteristic, wherein the characteristic is associated either with the autonomous mode or the manual mode; receive an input to provide data about the trip; and in response to the input, provide a user interface including the data about the trip, wherein the data includes the characteristic about the trip, wherein the data is categorized into the autonomous mode or the manual mode.

Any of the one or more above aspects, wherein the processor executes a data recorder that stores the characteristic.

Any of the one or more above aspects, wherein the characteristic is one of a trip statistic, an efficiency statistic, a safety statistic, or metadata.

Any of the one or more above aspects, wherein the trip statistic is one of a time on a road, a time in traffic, a time in manual mode, a time in autonomous mode, a number of stops, or a route taken.

Any of the one or more above aspects, wherein the efficiency statistic is one of a money spent on electricity, a number of hard accelerations, a number of hard stops, a time in autonomous mode, a number of stops, an amount of regenerated energy, or an amount of energy used.

Any of the one or more above aspects, wherein the safety statistic is one of an action identifier, an action time, a response time, an action result, or metadata.

Any of the one or more above aspects, further comprising a data summarizer, executed by the processor, retrieving the stored characteristic.

Any of the one or more above aspects, wherein the processor executes a sensor interface that receives the information from the sensor.

Any of the one or more above aspects, wherein the processor executes a sensor interface that receives the information from the sensor.

Any of the one or more above aspects, wherein the processor executes a user interface renderer that provides the user interface.

Any of the one or more above aspects, wherein the user interface is one of a route statistics user interface or a route efficiency user interface.

Any of the one or more above aspects, wherein the input to provide data about the trip is into a journey summary user interface.

Embodiments include a method comprising: a vehicle commencing a trip, wherein the vehicle comprises a processor and a sensor; determining, by the processor, whether the vehicle is in an autonomous mode or a manual mode; receiving, by a sensor interface executed by the processor, information from the sensor regarding a characteristic of the trip; storing, by a data recorder executed by the processor, the characteristic, wherein the characteristic is associated either with the autonomous mode or the manual mode; receiving, by a user interface renderer executed by the processor, an input to provide data about the trip; and in response to the input, providing, by the user interface renderer executed by the processor, a user interface including the data about the trip, wherein the data includes the characteristic about the trip, wherein the data is categorized into the autonomous mode or the manual mode.

Any of the one or more above aspects, wherein the characteristic is one of a time on a road, a time in traffic, a time in manual mode, a time in autonomous mode, a number of stops, a route taken, a money spent on electricity, a number of hard accelerations, a number of hard stops, a number of stops, an amount of regenerated energy, an amount of energy used, an action identifier, an action time, a response time, an action result, or metadata.

Any of the one or more above aspects, wherein the characteristic is one of a trip statistic, an efficiency statistic, a safety statistic, or metadata.

Any of the one or more above aspects, further comprising retrieving, by a data summarizer executed by the processor, the stored characteristic.

Any of the one or more above aspects, wherein the user interface is one of a route statistics user interface or a route efficiency user interface.

Any of the one or more above aspects, wherein the input to provide data about the trip is into a journey summary user interface.

Embodiments include a navigation subsystem of a vehicle, comprising: a processor in communication with a sensor, wherein the sensor senses data associated with a trip conducted by the vehicle, the processor to: determine whether the vehicle is in an autonomous mode or a manual mode; receive information from the sensor regarding a characteristic of the trip; store the characteristic, wherein the characteristic is associated either with the autonomous mode or the manual mode; receive an input to provide data about the trip; and in response to the input, provide a user interface including the data about the trip, wherein the data includes the characteristic about the trip, wherein the data is categorized into the autonomous mode or the manual mode.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A vehicle, comprising:
a sensor that senses data collected during a trip conducted by the vehicle;
an autonomous vehicle control system, comprising:
a processor in communication with the sensor; and
a memory coupled with and readable by the processor and storing therein instructions that, when executed by the processor, cause the processor to:
determine when the vehicle is in an autonomous driving mode and when the vehicle is in a manual driving mode during the trip;
receive information from the sensor regarding a characteristic of the trip;
store the characteristic, wherein the characteristic is associated either with the autonomous driving mode or the manual driving mode;
determine, based on the characteristic, that the vehicle made an evasive maneuver during the trip while the vehicle was in the autonomous driving mode;
determine, based on the characteristic, that the evasive maneuver prevented an accident;
receive an input to provide a journey summary comprising data about the trip; and
render, to a display device associated with the vehicle in response to receiving the input, a user interface window including the journey summary comprising mixed autonomy data about the trip, wherein the mixed autonomy data is categorized into the autonomous driving mode and the manual driving mode, and wherein the mixed autonomy data categorized into the autonomous driving mode includes information about the evasive maneuver made by the vehicle during the trip and a result of the evasive maneuver.

2. The vehicle of claim 1, wherein the processor executes a data recorder that stores the characteristic.

3. The vehicle of claim 1, wherein the mixed autonomy data comprises two or more of a trip statistic, an efficiency statistic about the trip, and a safety statistic about the trip, wherein the result of the evasive maneuver corresponds to the safety statistic, and wherein the safe statistic indicates at least one of accidents avoided and lives saved as the result of the evasive maneuver.

4. The vehicle of claim 3, wherein the trip statistic comprises two or more of a time on a road, a time in traffic, a time in manual driving mode, a time in autonomous driving mode, and a number of stops made during the trip.

5. The vehicle of claim 3, wherein the efficiency statistic comprises two or more of an amount of money spent on electricity for the trip, a number of hard accelerations made during the trip, a number of hard stops made during the trip, a time in autonomous driving mode during the trip, a number of stops made during the trip, an amount of energy regenerated by the vehicle during the trip, and an amount of energy used by the vehicle during the trip.

6. The vehicle of claim 3, wherein the safety statistic comprises at least one of a time the evasive action was taken by the vehicle during the trip, and a response time for the vehicle to conduct the evasive action.

7. The vehicle of claim 6, further comprising a data summarizer, executed by the processor, retrieving the stored characteristic.

8. The vehicle of claim 7, wherein the processor executes a sensor interface that receives the information from the sensor.

9. The vehicle of claim 8, wherein the processor executes a user interface renderer that renders the user interface window.

10. The vehicle of claim 9, wherein the user interface window comprises a route statistics user interface and a route efficiency user interface.

11. The vehicle of claim 10, wherein the input to render the user interface window is received by the display device associated with the vehicle, and wherein the display device associated with the vehicle is disposed inside the vehicle.

12. A method, comprising:
    determining, by a processor of a vehicle conducting a trip, when the vehicle is in an autonomous driving mode and when the vehicle is in a manual driving mode during the trip;
    receiving, by a sensor interface executed by the processor, information from a sensor of the vehicle regarding a characteristic of the trip based on data collected by the sensor during the trip;
    storing, by a data recorder executed by the processor, the characteristic, wherein the characteristic is associated either with the autonomous driving mode or the manual driving mode;
    determining, by the processor based on the characteristic, that the vehicle made an evasive maneuver during the trip while the vehicle was in the autonomous driving mode;
    determining, by the processor based on the characteristic, that the evasive maneuver prevented an accident;
    receiving, by a user interface renderer executed by the processor, an input to provide a journey summary comprising data about the trip; and
    rendering, by the user interface renderer executed by the processor in response to receiving the input, a user interface window including the journey summary comprising mixed autonomy data about the trip, wherein the mixed autonomy data is categorized into the autonomous driving mode and the manual driving mode, and wherein the mixed autonomy data categorized into the autonomous driving mode includes information about the evasive maneuver made by the vehicle during the trip and a result of the evasive maneuver.

13. The method of claim 12, wherein the mixed autonomy data comprises two or more of a time on a road, a time in traffic, a time in manual driving mode, a time in autonomous driving mode, a number of stops, an amount of money spent on electricity for the trip, a number of hard accelerations, made during the trip, a number of hard stops made during the trip, a number of stops made during the trip, an amount of energy regenerated by the vehicle during the trip, an amount of energy used by the vehicle during the trip, a time the evasive action was taken by the vehicle during the trip, and a response time for the vehicle to conduct the evasive action.

14. The method of claim 12, wherein the mixed autonomy data comprises two or more of a trip statistic, an efficiency statistic about the trip, a safety statistic about the trip, wherein the result of the evasive maneuver corresponds to the safety statistic, and wherein the safety statistic indicates at least one of accidents avoided and lives saved as the result of the evasive maneuver.

15. The method of claim 12, further comprising retrieving, by a data summarizer executed by the processor, the stored characteristic.

16. The method of claim 12, wherein the user interface window comprises a route statistics user interface and a route efficiency user interface.

17. The method of claim 12, wherein the input to render the user interface window is received by the display device associated with the vehicle, and wherein the display device associated with the vehicle is disposed inside the vehicle.

18. The method of claim 12, further comprising:
    determining, by the processor, an autonomous driving behavior of the vehicle while operating in the autonomous driving mode, the autonomous driving behavior including a first amount of energy used by the vehicle while operating in the autonomous driving mode;
    determining, by the processor, a manual driving behavior of the vehicle while operating in the manual driving mode, the manual driving behavior including a second amount of energy used by the vehicle while operating in the manual driving mode, wherein the second amount of energy is greater than the first amount of energy;
    determining, by the processor based on a comparison of the first amount of energy to the second amount of energy, an autonomous driving mode efficiency for the vehicle, and wherein the journey summary rendered to the display device associated with the vehicle comprises the autonomous driving mode efficiency identifying a benefit for operating the vehicle in the autonomous driving mode.

19. A navigation subsystem of a vehicle, comprising:
    a processor in communication with a sensor of the vehicle that senses data collected during a trip conducted by the vehicle; and
    a memory coupled with and readable by the processor and storing therein instructions that, when executed by the processor, cause the processor to:
        determine when the vehicle is in an autonomous driving mode or and when the vehicle is in a manual driving mode during the trip;
        receive information from the sensor regarding a characteristic of the trip;
        store the characteristic, wherein the characteristic is associated either with the autonomous driving mode or the manual driving mode;
        determine, based on the characteristic, that the vehicle made an evasive maneuver during the trip while the vehicle was in the autonomous driving mode;
        determine, based on the characteristic, that the evasive maneuver prevented an accident;
        receive an input provide a journey summary comprising data about the trip; and
        render, to a display device associated with the vehicle in response to receiving the input, a user interface window including the journey summary comprising mixed autonomy data about the trip, wherein the mixed autonomy data is categorized into the autonomous driving mode and the manual driving mode, and wherein the mixed autonomy data categorized into the autonomous driving mode includes information about the evasive maneuver made by the vehicle during the trip and a result of the evasive maneuver.

20. The navigation subsystem of claim 19, wherein the instructions further cause the processor to:
    determine an autonomous driving behavior of the vehicle while operating in the autonomous driving mode, the autonomous driving behavior including a first amount of energy used by the vehicle while operating in the autonomous driving mode;

determine a manual driving behavior of the vehicle while operating in the manual driving mode, the manual driving behavior including a second amount of energy used by the vehicle while operating in the manual driving mode, wherein the second amount of energy is greater than the first amount of energy;

determine, based on a comparison of the first amount of energy to the second amount of energy, an autonomous driving mode efficiency for the vehicle, and wherein the journey summary rendered to the display device associated with the vehicle comprises the autonomous driving mode efficiency identifying a benefit for operating the vehicle in the autonomous driving mode.

\* \* \* \* \*

UNITED STATES PATENT AND TRADEMARK OFFICE
CERTIFICATE OF CORRECTION

PATENT NO. : 10,818,110 B2
APPLICATION NO. : 15/947232
DATED : October 27, 2020
INVENTOR(S) : Robin Bigio et al.

Page 1 of 1

It is certified that error appears in the above-identified patent and that said Letters Patent is hereby corrected as shown below:

In the Claims

Claim 3, Column 40, Line 46, replace "safe" with --safety-- therein.
Claim 13, Column 41, Line 51, delete the "," after "accelerations" therein.
Claim 19, Column 42, Line 49, after "input" insert --to-- therein.

Signed and Sealed this
Twenty-ninth Day of December, 2020

Andrei Iancu
*Director of the United States Patent and Trademark Office*